United States Patent [19]

Leandris et al.

[11] Patent Number: 4,875,286

[45] Date of Patent: Oct. 24, 1989

[54] APPARATUS AND METHOD OF MANUFACTURING ELECTRICAL CABLING SYSTEMS

[75] Inventors: Sergio Leandris, Fenouillet; Jose Moly, Gratentour, both of France

[73] Assignee: Precision Mecanique Labinal, Bois D'Arcy, France

[21] Appl. No.: 225,670

[22] Filed: Jul. 25, 1988

Related U.S. Application Data

[63] Continuation of Ser. No. 941,320, Dec. 15, 1986, abandoned.

[30] Foreign Application Priority Data

Mar. 19, 1986 [FR] France .................................. 86 3927

[51] Int. Cl.[4] ........................ H01R 43/00; B23P 19/00

[52] U.S. Cl. ........................................ 29/872; 29/753; 29/564.4; 29/566.2; 29/566.3

[58] Field of Search .............. 29/818, 872, 753, 564.4, 29/566.3, 566.2

[56] References Cited

U.S. PATENT DOCUMENTS 1,618,734 2/1927 Smitak .

1,836,497 12/1931 Phelps et al. .

3,594,900 7/1971 Dola et al. ........................ 29/753 X 3,927,453 12/1975 Zahn et al. ........................ 29/753 X 4,084,310 4/1978 Dragisic .

FOREIGN PATENT DOCUMENTS 2491690 4/1982 France .

*Primary Examiner*—Howard N. Goldberg

*Assistant Examiner*—Carl J. Arbes

*Attorney, Agent, or Firm*—Sandler & Greenblum

[57] ABSTRACT

An apparatus and method of manufacturing bundles of electrical cables. The bundles include a plurality of main conductors and a plurality of secondary conductors. The main and secondary conductors both include a conductor core and an insulating sheath. The ends of the main conductors include box-like connection elements which are either male plugs or female sockets. The method includes the steps of: stripping an intermediate portion of the main conductors; stripping the ends of the secondary conductor; positioning the stripped portions of the main and secondary conductors tightly against one another; mounting a thimble on the two stripped portions; and mounting a band of cold-deformable insulating material on the thimble. The apparatus includes devices which perform each of these functions.

53 Claims, 21 Drawing Sheets

FIG.10
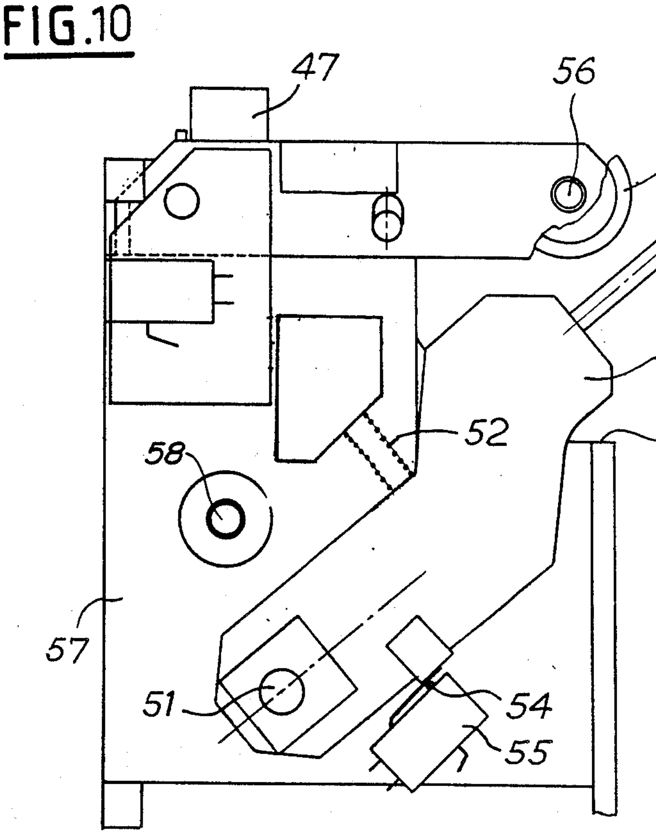
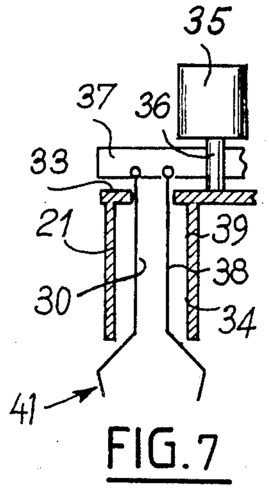
FIG.7
FIG.6
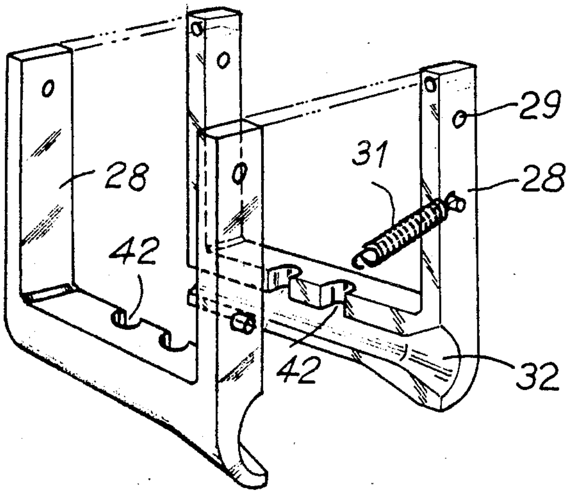

APPARATUS AND METHOD OF MANUFACTURING ELECTRICAL CABLING SYSTEMS

This application is a continuation Ser. No. 941,320 filed Dec. 15, 1986, now abandoned.

BACKGROUND OF THE INVENTION

1. Field of the Invention

The present invention relates to the manufacture of bundles of electrical cabling systems for the automobile industry.

2. Description of Pertinent Information

Cabling systems comprise a main bundle of primary or main conductors. One end of the bundle is fitted with a box element having male plugs or female sockets adapted to engage a complementary box element, while the other end is also provided with a box element having male plugs or female sockets also adapted to engage a complementary element. From a main bundle of this kind secondary shunts must be proVided. In order to accommodate these secondary shunts the two box elements of the main bundle comprise a set of supplementary sockets or plugs connected to box elements on the ends of secondary conductors. When numerous secondary shunts are required, the dimensions of the box elements of the main bundle of primary conductors must be increased in order to provide for the necessary supplementary sockets or plugs. This is disadvantageous. In addition, a very large number of electrical conductors must be used, also increasing the dimensions of the bundle.

Thus, there is a need for a cabling system that has a small size, but can accommodate numerous secondary shunts.

SUMMARY OF THE INVENTION

It is an object of the present invention to overcome the disadvantages of the prior art.

It is still another object of the present invention to provide an apparatus and method for manufacturing bundles of electrical cabling systems of a small size and that accommodate numerous secondary shunts.

In one embodiment the present invention which achieves these goals is directed to a method for manufacturing bundles of electrical cabling systems. The systems comprise a plurality of main conductors and a plurality of secondary conductors. The main conductors comprise a conductor core, an insulating sheath having a plurality of ends, and connection elements connected to the plurality of ends. The connection elements comprise box elements comprising either male plugs or female sockets adapted to engage complementary elements. The secondary conductors comprise a conductor core and an insulating sheath. The core is mounted in the sheath. In this embodiment the method comprises the steps of:

(a) stripping an intermediate portion of at least one main conductor;

(b) stripping at least one secondary conductor in the general vicinity of at least one of the ends of the least one main conductor;

(c) positioning the stripped portions of the main and secondary conductors against one another tightly;

(d) mounting a thimble on the two stripped portions; and (e) mounting a band of cold-deformable insulating material on the thimble.

In addition, the method can further comprise the steps of performing steps (a)–(e) a plurality of times for a plurality of main and secondary conductors. In addition the method further comprises the step of inserting a pasty insulating material between the thimble and the band of insulating material. The pasty material can be silicone or a silicone material.

In still another embodiment the invention is directed to an electrical cabling system manufactured by the following method:

(a) stripping an intermediate portion of at least one main conductor;

(b) stripping at least one secondary conductor in the general vicinity of at least one of the ends of the at least one secondary conductor corresponding to the at least one main conductor;

(c) positioning the stripped portions of the main and secondary conductors against one another tightly;

(d) mounting a thimble on the two stripped portions; and (e) mounting a band of cold-deformable insulating material on the thimble. The electrical cabling system manufactured by this method comprises at least one main conductor and at least one secondary conductor. The main conductor comprises: a conductor core; an insulating sheath having a plurality of ends, wherein the core is mounted in the sheath; and connection elements connected to the plurality of ends. The connection elements comprise box elements comprising either male plugs or female sockets adapted to engage complementary elements. The at least one secondary conductor comprises a conductor core and an insulating sheath. The core of the secondary conductor is mounted in the sheath of the secondary conductor. In addition, the system can further comprise a plurality of main and secondary conductors. In this embodiment the method is performed a plurality of times on each main and secondary conductor.

In still another embodiment the invention relates to an apparatus for manufacturing bundles of electrical cabling systems. The cabling systems comprise at least one main conductor and at least one secondary conductor. The main conductor comprises a conductor core, an insulating sheath having a plurality of ends, and connection elements connected to the plurality of ends. The connection elements comprise box elements comprising either male plugs or female sockets adapted to engage complementary elements. The secondary conductor comprises a conductor core and an insulating sheath. The core is mounted in the sheath. The apparatus comprises:

(a) means for stripping an intermediate portion of at least one main conductor;

(b) means for stripping at least a portion of at least one secondary conductor in the general vicinity of at least one of the ends of the at least one secondary conductor corresponding to the at least one main conductor;

(c) means for positioning the stripped portions of the main and secondary conductors tightly against one another to produce a splice;

(d) means for mounting a thimble on the two stripped portions at the splice; and (e) means for mounting a band of cold-deformable insulating material on the thimble.

In one embodiment the system comprises a plurality of pairs of main and secondary conductors. The plurality of main conductors comprises a bundle. In this embodiment stripping means (a) and (b) comprise means for stripping each pair of main and secondary conductors, the positioning means comprises means for positioning the stripped portions of one member of each pair of the main and secondary conductors tightly against the other member of each pair of the main and secondary conductors, mounting means (d) comprise means for mounting a thimble on the stripped portions of each pair of the plurality of main and secondary conductors, and mounting means (e) comprises means for mounting a band of cold-deformable insulating material on each thimble.

The apparatus further comprises: a frame; a loading station for receiving the stripped secondary conductors, the station being supported by the frame; means for holding the bundle of main conductors; means for driving the bundle of main conductors through the apparatus; means for guiding the bundle of main conductors through the apparatus; means for stopping the driving of the bundle of main conductors; means for displacing the bundle of main conductors into a predetermined position; means for extracting the secondary conductors from the loading station; means for positioning and maintaining at least one pair of main and secondary conductors side-by-side after stripping of the main conductor by the stripping means; means for firmly securing the two stripped portions on the main and secondary conductors, the securing means comprising a thimble; and means for enclosing the thimble in insulation after the thimble secures the two stripped portions.

The loading station comprises a box comprising a pair of stirrups. Each stirrup comprises a web and each web comprises a groove. Two corresponding grooves from the webs together comprise a substantially rectilinear throat adapted to accommodate a secondary conductor. Each throat has a base, and each stirrup is pivotally mounted on the apparatus. The loading station also comprises a restoring spring for biasing the stirrups against the pivoting, a contact positioned in the base of each throat, and a control circuit. The control circuit closes in response to displacement of the contact. The loading station further comprises a jack actuated by the closing of the control circuit. The jack comprises a piston rod adapted to be displaced from a retracted position into an extended position, a plurality of tubular elements integral with the piston rod and adapted to engage the webs of the stirrups to deflect the stirrups to form a slit in the substantially rectilinear throat of a size sufficient to accommodate the secondary conductor, and a plurality of elastic metal rods. A pair of the elastic metal rods extend through each tubular element. The rods each comprise a bent free end. Each pair of bent free ends of the rods form a tong adapted to grip the secondary conductor. Each tong grips the secondary conductor before deflection of the stirrups, thereby guiding the secondary conductor through the slit formed in the throat in response to displacement of the piston rod into the extended position.

The apparatus further comprises a plurality of pairs of stirrups. In this embodiment the extended position of the piston rod is lower than the retracted position of the piston rod so that each tong grips the secondary conductor before deflection of the stirrups, thereby guiding the secondary conductor through the slit formed in the throat in response to descent of the piston rod into the extended position.

The driving means can comprises a tape winding machine for winding tape around the bundle of main conductors. The tape winding machine comprises an endless chain comprising means for attachment to the bundle of main conductors, and a motor for driving the endless chain.

The guiding means comprises a plurality of brakes and a plurality of springs. The plurality of brakes are adapted to engage the main conductors and the plurality of brakes are pivotally mounted on the frame. Each brake comprises two limbs. The plurality of springs bias the plurality of brakes against the pivoting noted above. The plurality of brakes and springs comprise means for elastically gripping the main conductors between the two limbs.

As noted above the driving means comprises a tape winding machine for winding tape around the bundle of main conductors. In addition, the guiding means further comprises a wire guiding device retractably mounted on the apparatus and positioned upstream from the tape winding machine.

The apparatus further comprises a shaft mounted on the frame, a sleeve supported by the shaft, and a toggle. The wire guide is attached to the sleeve so that the wire guide is adapted to pivot between an operating position and a retracted position. In the operating position the wire guide engages the main conductors. In the retracted position the wire guide is disengaged from the main conductors. The toggle biases the wire guide against displacement out of the operating and retracted positions.

In one embodiment the apparatus comprises means for operating in response to receiving current. In this embodiment the guiding means comprises an element pivotally mounted on the apparatus, a spring biasing the element against pivoting, a comb for guiding the bundle of main conductors, and a circuit comprising a contact. The comb is supported by the element, and the element is adapted to bear against the contact. The circuit comprises means for interrupting the current to the apparatus in response to pivoting of the element against the bias of the spring beyond a predetermined extent.

In this embodiment the guiding means further comprises a plurality of brakes and a plurality of springs. The plurality of brakes are adapted to engage the main conductors and are pivotally mounted on the frame. Each brake comprises two limbs. The plurality of springs bias the plurality of brakes against the pivoting noted above. The plurality of brakes and springs comprise means for elastically gripping the main conductors between the two limbs. In addition, in this embodiment the driving means comprises a tape winding machine for winding tape around the bundle of main conductors, and the guiding means further comprises a wire guide retractably mounted on the apparatus and positioned upstream from the tape winding machine. In addition, in this embodiment the apparatus further comprises a shaft mounted on the frame, a sleeve supported by the shaft, and a toggle. The wire guide is attached to the sleeve so that the wire guide is adapted to pivot between an operating position and a retracted position. In the operating position the wire guide engages the main conductors. In the retracted position the wire guide is disengaged from the main conductors. The toggle biases the wire guide against displacement out of the operating and retracted positions.

The main conductor stripping means comprises a securing clamp for enclosing and clamping the main conductors to be stripped, the securing clamp being adapted to be opened and closed, means for displacing the clamp into the closed position in which the clamp clamps the main conductors, and a stripping clamp for stripping the main conductors. The stripping clamp comprises two knives for cutting the sheath of the main conductors. The stripping clamp and the two knives are adapted to be displaced into a closed position in which the knives contact the sheath of the main conductors and into a retracted open position in which the knives are spaced from the sheath. In addition, the main conductor stripping means also comprises means for displacing the stripping clamp and the securing clamp into the opened positions.

The securing and stripping clamps each comprise first and second limbs. In this embodiment the main conductor stripping means further comprises first, second, third, and fourth substantially parallel shafts. The first limbs of the securing and stripping clamps are journalled, respectively, on the first and third shafts around first and third pivot axes. The second limbs of the securing and stripping clamps are journalled, respectively, on the second and fourth shafts around second and fourth pivot axes. The first and third pivot axes and shafts are coaxial, and the second and fourth shafts and pivot axes are coaxial. The first limbs of the stripping and securing clamps are connected to each other and the second limbs of the stripping and securing clamps are connected to each other such that the opening and closing of the stripping and securing clamps are synchronized and interdependent.

The main conductor stripping means further comprises a shaft attached to the apparatus and extending substantially orthogonal to the pivot axes of the clamp limbs, and a plate pivotally mounted on the shaft. The stripping clamp is supported by the plate.

The securing clamp further comprises means for biasing the securing clamp into the open position, and a plurality of rollers. One roller is positioned on each limb of the securing clamp. The means for displacing the securing clamp into the closed position comprises a jack. The jack comprises a piston adapted to be displaced from a retracted position to a first intermediate position, a second intermediate position, and then to an extended position. The jack also comprises a first cam comprising an inclined portion adapted to engage the rollers. The first cam comprises means for pivoting the securing clamp limbs into the closed position by means of contact between the inclined portion and the roller in response to displacement of the piston to the first intermediate position. The first cam further comprises means for displacing the inclined portion below the roller so that the first cam is spaced from the roller in response to displacement of the piston from the first intermediate position to the extended position. The biasing means comprises the means for displacing the securing clamp into the open position in response to spacing of the first cam from the roller.

The plate further comprises a roller, and the piston rod further comprises a second cam extending orthogonally to the first cam and adapted to engage the roller of the plate.

The jack comprises means for pressing the second cam against the roller of the plate in response to displacement of the piston into the second intermediate position. The roller of the plate comprises means for pivoting the plate, and the plate comprises means for squeezing the knives into the sheath of the main conductors in response to pivoting of the plate by the roller.

In one embodiment the frame further comprises a plurality of horizontally extending rails. In this embodiment the apparatus further comprises a first carriage mounted to slide horizontally on the plurality of rails, means for displacing the first carriage horizontally on the plurality of rails, and vertically displaceable clamps supported on the first carriage for gripping one of the main conductors onto which a secondary conductor is to be grafted. In this embodiment the extracting means discussed above comprises vertically displaceable tongs supported on the first carriage for extracting the secondary conductors from the loading station. In addition, the positioning and maintaining means noted above comprises the clamps and the tongs.

In this embodiment the firmly securing means is supported on the carriage and further comprises a strip of thimbles, means for advancing the strip of thimbles through the apparatus, and means for separating one of the thimbles from the strip and for tightly mounting the one of the thimbles on the conductors.

The separating means comprises an anvil against which one of the thimbles is pressed to separate the one of the thimbles from the strip.

In one embodiment the first carriage further comprises a slit. In this embodiment the separating means further comprises a tool comprising a displaceable lever and a shaft attached to the first carriage. The lever is journalled on the shaft. In addition, the separating means further comprises a jack comprising a piston rod for displacing the tool. The separating means also comprises the slit. The slit is adapted to accommodate the lever therein, and the piston rod comprises means for displacing the lever into the slit and for pressing the lever laterally against the one of the thimbles to exert lateral pressure against the one of the thimbles.

The advancing means comprises a catch for engaging the strip of thimbles, and a jack comprising a piston rod for displacing the catch step-by-step, thereby displacing the strip of thimbles step-by-step. The catch is attached to the rod of the jack of the advancing means, and the strip of thimbles comprises two flanges having two edges. The advancing means further comprises a slideway in which the strip advances, a slide integral with the rod of the jack of the advancing means, a spring on the slide, and a shaft on the slide. The shaft pivotally mounts the catch on the slide, and the spring biases the catch. The advancing means further comprises means for engaging the catch with the two edges of the strip and for displacing the strip in the slideway in response to forward displacement of the rod of the jack of the advancing means, and means for displacing the catch in a rearward direction and for disengaging the catch from the strip in response to rearward displacement of the rod of the jack of the advancing means. In addition, the the tool is positioned adjacent to the end of the slideway.

The apparatus further comprises a second carriage displaceable horizontally on the frame, and means for displacing the second carriage horizontally on the frame. In this embodiment the second carriage supports the main conductor stripping means, and the main conductor stripping means is mounted to slide vertically on the second carriage. In addition, the apparatus further comprises a jack for vertically displacing the main conductor stripping means.

In one embodiment the second carriage comprises a cavity adapted to receive the splice. In this embodiment the apparatus further comprises a reel supported by the second carriage, a strip of cold-deformable insulating material on the reel, means for advancing the strip of cold-deformable insulating material a distance corresponding to the length of insulation desired, means for cutting off a piece of the cold-deformable insulating material from the strip of cold-deformable insulating material, and means for tightly mounting the cut off piece of cold-deformable insulating material on the splice.

In addition, the second carriage further comprises a jack comprising a piston, a slide for driving the strip of cold-deformable insulating material, and a non-return brake. The slide is supported by the piston. Also, the strip of cold-deformable insulating material extends through the brake. The brake comprises means for permitting displacement of strip of cold-deformable insulating material in a first direction and for preventing displacement of the strip of cold-deformable insulating material in a second direction opposite from the first direction.

In one embodiment the slide comprises an aperture therein. In this embodiment the second carriage further comprises a cartridge, a pasty insulating product inside the cartridge, a distribution tube terminating at the strip of cold-deformable insulating material opposite from the aperture, and means for conveying a drop of the pasty insulating product from the distribution tube to the strip of cold-deformable insulating material.

The second carriage further comprises a source of compressed air, a tube connecting the source to the cartridge, and a timing device for controlling the length of time the compressed air is conveyed through the connecting tube to the cartridge. The pasty insulating product is subjected to a predetermined quantity of compressed air for a predetermined period of time so as to convey a predetermined amount of the pasty insulating product through the distribution tube.

The second carriage further comprises a guide blade for guiding the strip of cold-deformable insulating material into the cavity. The guide blade is supported by the slide.

In addition, the second carriage further comprises a fixed knife positioned above the cavity, a passageway having a first portion extending in a direction from the cavity toward the loading station and the main conductor stripping means, and a displaceable knife positioned in the first portion the passageway and adapted to be displaced in the first portion of the passageway toward the cavity to engage the fixed knife to cut the cold-deformable insulating material.

The passageway also comprises a second portion extending from the cavity in a direction opposite from the direction in which the first portion extends. In this embodiment the second carriage comprises a die positioned in the first portion of the passageway, a punch positioned in the second portion of the passageway, a jack for displacing the punch in the second portion of the passageway, and a jack for displacing the die in the first portion of the passageway against the punch.

The die comprises a push rod, and the jack for displacing the die comprises means for displacing the push rod axially in the passageway.

The jack for displacing the die comprises means for displacing the push rod axially in the passageway to hold the strip of cold-deformable material against the splice positioned in the cavity.

The apparatus further comprises a carriage displaceable horizontally on the frame, and means for displacing the carriage horizontally on the frame. The carriage supports the main conductor stripping means, and the main conductor stripping means is mounted to slide vertically on the carriage. The apparatus further comprises a jack for vertically displacing the main conductor stripping means.

The carriage comprises a cavity adapted to receive the splice, and the apparatus further comprises: a reel supported by the carriage; a strip of cold-deformable insulating material on the reel; means for advancing the strip of cold-deformable insulating material a distance corresponding to the length of insulation desired; means for cutting off a piece of the cold-deformable insulating material from the strip of cold-deformable insulating material; and means for tightly mounting the cut off piece of cold-deformable insulating material on the splice. In addition, the carriage further comprises: a jack comprising a piston; a slide for driving the strip of cold-deformable insulating material, the slide being supported by the piston; and a non-return brake. The strip of cold-deformable insulating material extends through the brake. The brake comprises means for permitting displacement of strip of cold-deformable insulating material in a first direction and for preventing displacement of the strip of cold-deformable insulating material in a second direction opposite from the first direction.

The slide comprises an aperture therein, and the second carriage further comprises: a cartridge; a pasty insulating product inside the cartridge; a distribution tube terminating at the strip of cold-deformable insulating material opposite from the aperture; and means for conveying a drop of the pasty insulating product from the distribution tube to the strip of cold-deformable insulating material. The apparatus further comprises a source of compressed air; a tube connecting the source to the cartridge; and a timing device for controlling the length of time the compressed air is conveyed through the connecting tube to the cartridge. The pasty insulating product is subjected to a predetermined quantity of compressed air for a predetermined period of time so as to convey a predetermined amount of the pasty insulating product through the distribution tube.

The carriage further comprises a guide blade for guiding the strip of cold-deformable insulating material into the cavity, the guide blade being supported by the slide. In addition, the carriage further comprises: a fixed knife positioned above the cavity; a passageway having a first portion extending in a direction from the cavity toward the loading station and the main conductor stripping means; and a displaceable knife positioned in the first portion of the passageway and adapted to be displaced in the first portion of the passageway toward the cavity to engage the fixed knife to cut the cold-deformable insulating material. The passageway also comprises a second portion extending from the cavity in a direction opposite from the direction in which the first portion extends. In this embodiment the second carriage comprises: a die positioned in the first portion of the passageway; a punch positioned in the second portion of the passageway; a jack for displacing the punch in the second portion of the passageway; and a jack for displacing the die in the first portion of the passageway against the punch.

The apparatus further, comprises a tape winding machine for winding tape around the bundle of main conductors. The tape winding machine comprises: a channel for grouping the main conductors together; a tape winding head; a roll of tape supported by the head; means for rotating the head and for winding the tape onto the bundle of main conductors; an endless chain; a motor for rotatably driving the endless chain; means for connecting the motor to the endless chain; a claw attached to the endless chain, the claw comprising means for attaching a box element of the bundle of main conductors to the endless chain; and an ejector for expelling the box element after the bundle is wound with the tape.

BRIEF DESCRIPTION OF THE DRAWINGS

The invention will now be described in greater detail in the detailed description which follows which describes particular discussed soley by way of example with reference the accompanying drawings, in which:

FIG. 6 illustrates a perspective view of one of a pair of stirrups the loading station of the present invention;

FIG. 7 illustrates a schematic cross-sectional view showing a detail of the mounting of the tongs at the loading station of the present invention;

FIG. 10 illustrates a side elevational view of the complete comb unit of the present invention;

DETAILED DESCRIPTION OF PREFERRED EMBODIMENTS

Figure 1:
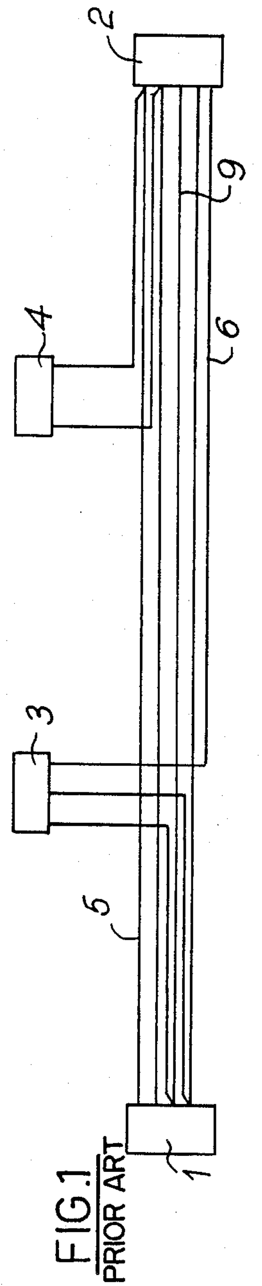
FIG.1 PRIOR ART
FIG. 1 illustrates a schematic view of a bundle of electrical conductors produced in accordance with the prior art.

The invention is directed to a process for manufacturing bundles of electrical cabling systems of the type having primary conductors which comprise a conductor core and an insulating sheath. The ends of the primary conductors include connection elements, such as box elements comprising male plugs or female sockets, adapted to engage complementary elements, and secondary conductors comprising a conductor core mounted in an insulating sheath. The process comprises the steps of stripping an intermediate part of the main conductors, stripping the secondary conductors near or adjacent to their corresponding end, placing the stripped parts of a main conductor and the corresponding secondary conductor against one another, tightly mounting a thimble on the two stripped parts and tightly mounting a band of a cold-deformable insulating material around the conductors.

A pasty insulating material such as a silicone is preferably inserted between the aforementioned thimble and band. Such a material enables the resulting splice to be watertight.

The invention also relates to bundles of electrical cabling systems constructed by the process outlined above. The bundles comprise a set of main conductors each having a conductor core mounted in an insulating sheath. The ends of the main conductors are adapted to be affixed to box elements comprising male sockets or female plugs which are adapted to engage corresponding complementary elements. The bundles also include secondary conductors comprising a conductor core mounted in an insulating sheath. The main conductors include a stripped portion positioned between its two extremities, while the secondary conductors include a corresponding stripped portion in the vicinity of or adjacent to one end of the secondary conductors. The stripped portions are placed against one another and secured by tightly mounting a thimble thereon. The thimble is tightly mounted in a band of cold-deformable insulating material. A pasty insulating material such as a silicone is inserted between the thimble and the insulating band tightly mounted on the thimble.

The invention also relates to a machine for performing the above described process which manufactures the bundles discussed above. The machine comprises a frame which supports a loading station adapted to receive a set of secondary conductors which have been rendered bare before reaching the loading station in the vicinity of or adjacent to one end of the secondary conductors. The bare end of the secondary conductors is adapted to be grafted onto the main conductors of a bundle already suitably prepared for such grafting. The machine also comprises means for accommodating the bundle of main conductors, means for guiding the bundle and driving the bundle, means for stripping the conductors, means for moving the bundle into selected positions, means for stripping a portion of the length of a main conductor onto which a secondary conductor is to be grafted, means for extracting from the loading station the secondary conductor to be grafted onto the main conductor of which a portion has been rendered bare, means for positioning and maintaining the two conductors side-by-side, means for firmly securing the two stripped parts of the two conductors with a thimble, and means for enclosing the thimble, thus secured, in an insulating element.

The loading station comprises a box provided with a series of rectilinear throats each adapted to accommodate a secondary conductor. Each throat is formed by two corresponding grooves made in the web of two adjacent stirrups arranged to tilt against the action of restoring springs. The base of each throat comprises a contact connected to a control circuit of a jack. The piston rod of the jack is integral with suitably guided tubular elements adapted to engage the webs of the stirrups in order to displace the stirrups aside and thus form a slit in the rectilinear throat. Each tubular element is traversed by two elastic metal rods. The free ends of the rods are bent in the form of tongs in such a way that during the descent of the piston rod the tongs close on the secondary conductor before the deflection of the stirrups, thus guiding the secondary conductor through the slit of the rectilinear throat.

According to one embodiment, the means for driving the bundle of main conductors comprises an endless chain driven by a motor of a tape winding machine.

In order to avoid any risk of deterioration of the bundle of main conductors as they move through the machine, the means for guiding the bundle of main conductors comprises a comb supported by a body mounted in such a way as to tilt against the bias of a spring. The body bears against a contact connected to a circuit adapted to interrupt the supply of current to the machine if the tilting movement performed by the body in opposition to the spring exceeds a certain preselected value.

The means for guiding the bundle of a main conductor also comprises brakes mounted on the frame. The brakes are adapted to tilt in opposition to the bias of a spring. The guiding means has two limbs elastically gripping the main conductors. These main conductors are thus stretched at all times throughout the different operations, such as stripping, tight mounting, etc.

According to a further characteristic detail of the present invention, the means for guiding the bundle of main conductors further comprises a wire guiding device retractably mounted on the machine and positioned "upstream" from the tape winding machine.

The wire guide is supported by a sleeve supported by a shaft mounted on the frame in such a way as to rotate against the bias of a toggle or "dead-point overtaking device", so that it can occupy an operating position and a retracted position.

The means for stripping a portion of the length of the main conductor comprises a securing clamp adapted to enclose the conductor to be rendered bare, a stripping clamp comprising two knives adapted to cut through the sheath of the conductor, and means for moving the two clamps apart. This provides a simple and rapid stripping means which automatically adapts itself to conductors of different cross-sections.

The securing clamp and the stripping clamp each have two limbs journalled on two parallel shafts. The corresponding shafts of the two clamps are coaxial and the limbs of one of the clamps are connected to those of the other so that the opening and the closing action of the clamps are synchronized and interdependent.

The stripping clamp is supported by a plate tiltably mounted on the shaft extending in a direction orthogonal to the swivel axes of the clamp limbs.

The means for stripping a portion of the length of the main conductor comprises a jack. The jack comprises a piston rod having a cam that engages the rollers of the limbs of the securing clamp. The cam has an inclined part corresponding to the closing movement of the limbs of the securing clamp and a precipitous part serving to ensure the rapid opening of the clamp after the gripping action.

The piston rod of the jack, which by means of its cam causes the securing clamp to close and open, is equipped with a second cam extending orthogonally in relation to the first cam and engaging a roller supported by the plate bearing the stripping clamp.

The machine further comprises a first carriage mounted to slide horizontally on rails supported by the frame. The carriage is connected to means for displacing it and the carriage supports vertically movable tongs for extracting a secondary conductor from the loading station. The carriage also supports vertically movable clamps for gripping a main conductor onto which the secondary conductor is to be grafted. In addition, the carriage also comprises means for positioning and maintaining side by side the main conductor having its stripped portion and the secondary conductor to be grafted, with its corresponding stripped portion. The carriage further comprises means for displacing a thimble against the two stripped portions, and means for tightly mounting the thimble on the stripped portions.

The carriage is preferably also provided with means for advancing a strip of thimbles step-by-step (i.e. the distance of one thimble at a time), means for cutting the thimble from one end of the strip of thimbles, and a tool connected to control means for thrusting the cut-off thimble against an anvil for tightly mounting the thimble on the conductors.

To enable the mounting operation to be effected without producing lateral rough edges on the thimbles or the strip the tool is supported by the piston rod of a jack and bears a movable lever journalled to a shaft and guided in a slit in order to exert lateral pressure on the thimble being mounted. The thimble is thus accurately secured in position during its mounting.

According to one embodiment the means for causing the strip of thimbles to advance step by step comprises a jack having a piston rod comprising a catch adapted to engage each thimble.

The machine also comprises a second carriage, movable horizontally on the frame and connected to means for controlling its movement. The second carriage supports the stripping station, which is mounted to slide vertically. A jack is interposed between the stripping station and the second carriage to control the vertical sliding movement of the stripping station.

The second carriage also supports a reel around which a strip or tape of cold-deformable insulating material is wound. The carriage further comprises: a cavity adapted to receive the splice; (i.e. the stripped portions of the main and secondary conductors that ar to be attached to each other) means for advancing the strip by a distance corresponding to the length of insulation to be produced; means for cutting off a piece of the strip; and means for tightly mounting the piece on the splice.

The second carriage further comprises a jack having a piston rod supporting a slide for driving the tape. The tape is guided in a passage through a non-return brake. The slide supports a guide blade for the tape, arranged to guide the tape in the cavity. The insulation of the tapes can thus be formed from a plastic material of very limited rigidity.

To ensure the accurate cutting of the tape the second carriage is provided, above the cavity, with a fixed knife, while a displaceable knife, moving in a slideway positioned to the right of the cavity (when the second carriage is viewed from the front), engages the fixed knife.

The displaceable knife is supported by a die controlled by a jack and guided in the slideway against a punch moving in the slideway and also controlled by a jack.

In order to hold the tape against the splice before it is tightly mounted on the splice, the die comprises a push rod movable axially in the die and controlled by a jack.

The second carriage can also support a cartridge holding a pasty product, comprising a distribution tube terminating on the tape opposite an aperture in the tape blade. Means are also provided to convey a drop of the pasty substance onto each piece of tape designed to form the insulation of the splice. The cartridge is preferably connected by a tube to a source of compressed air with a timing device in order to subject the pasty substance to a pressure which will convey a certain predetermined quantity of the pasty substance through the distribution tube.

The tape winding machine comprises a channel for grouping the conductors together, a head supporting a roll of tape; means for rotating the head in order to wind the tape onto the bundle of conductors, an endless chain driven to rotate by a motor via a kinematic connection system, a claw by which the box element corresponding to the bundle is attached to the endless chain, and an ejector serving to expel the box element after the bundle is wound with tape.

Figure 2:
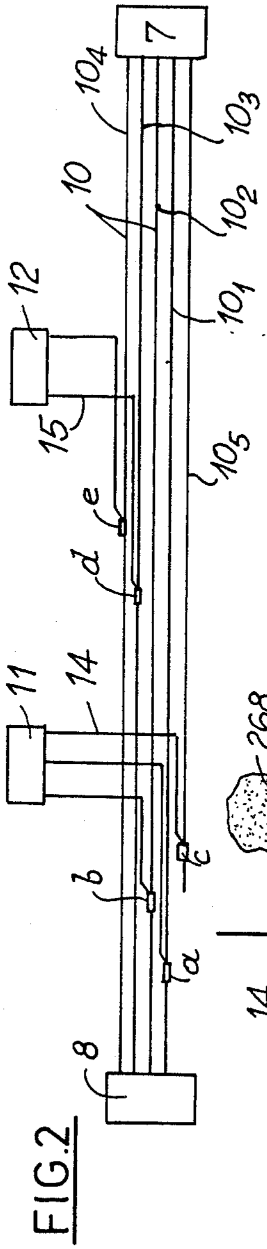
FIG. 2 illustrates a schematic view of a bundle of conductors produced in accordance with the present invention.

FIG. 1 and 2 are schematic illustrations of a bundle of electrical conductors which supply power to a motor vehicle. For example, FIG. 1 shows the conventional technique of constructing the bundle of electrical conductors, and FIG. 2 illustrates a bundle constructed in accordance with the present invention.

The bundle shown in FIG. 1 comprises two box elements 1 and 2 adapted to be electrically connected to corresponding elements provided on the motor vehicle. These elements are interconnected by electrical conductors 9 which comprise the main conductors. In the simplified embodiment shown in FIG. 1, two box elements 3 and 4 are also provided for supplying power to secondary elements such as, in this case, complementary conductors 5 and 6 which are connected to supplementary sockets in the box elements 1 and 2.

In contrast, the bundle shown in FIG. 2 is constructed with the machine of the present invention and comprises two box elements 7 and 8 interconnected by main or primary wires 10, and two box elements 11 and 12 for supplying power to secondary networks. Box elements 11 and 12 are fed, respectively, by secondary conductors 14 and 15 which are connected to the main conductors with the aid of splices produced directly by the machine which will be discussed in more detail below. In the discussion which follows, reference will be made to main or primary wires or conductors and will be identified by "10"; likewise, secondary wires or conductors will be identified by "14. Reference numerals "10" and "14" are not intended to correspond to any particular limiting arrangement or combination of primary and secondary conductors and the arrangement illustrated in FIG. 2 is merely exemplary of a completed bundle of electrical conductors. It should be understood that the machine of the present invention provides a valuable savings in terms of the length of electrical conductors required, as will become evident from the discussion which follows.

In the following discussion the apparatus of a preferred embodiment will first be described in detail. A discussion of the operation of the apparatus will then follow.

Figure 3:
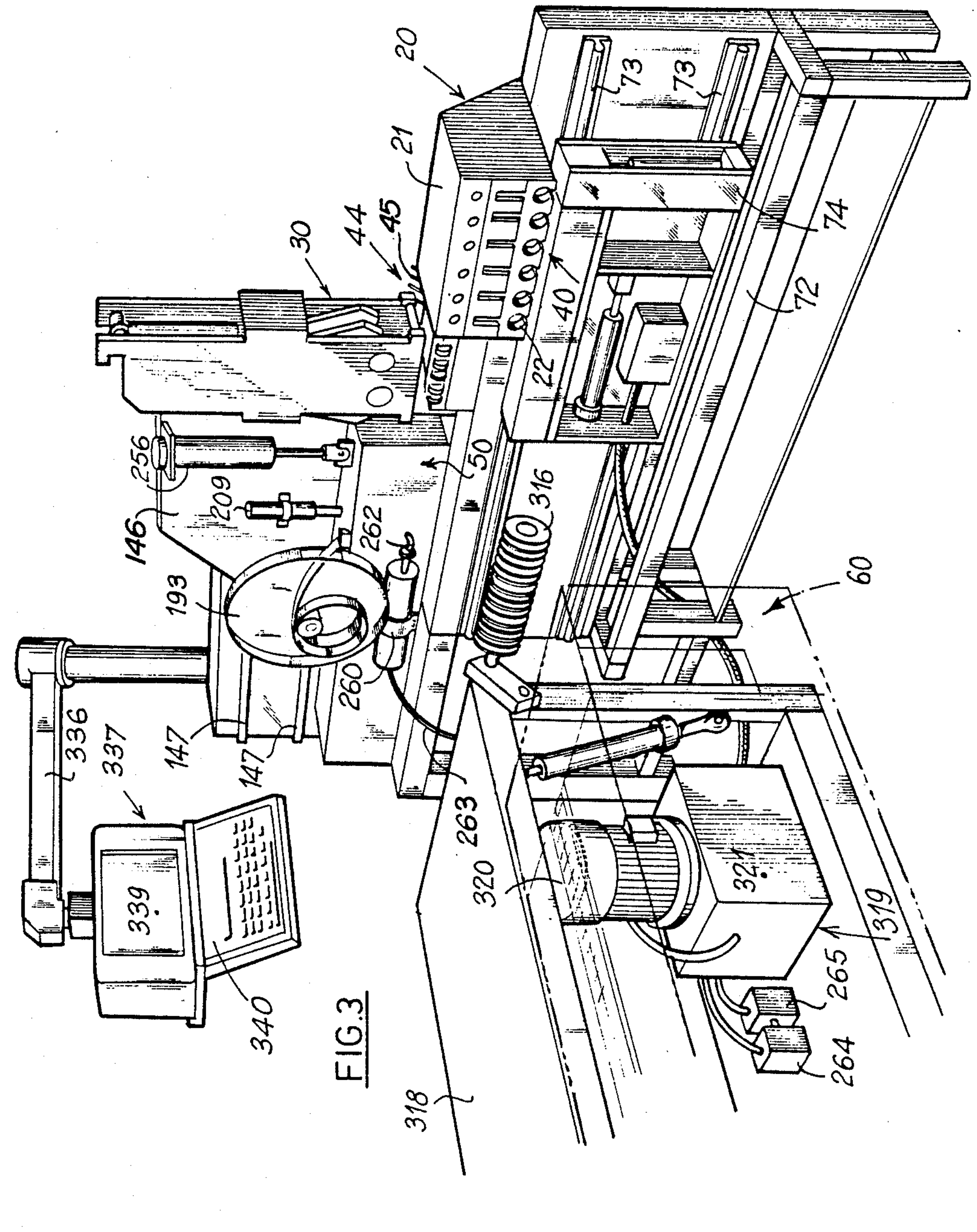
FIG. 3 illustrates a perspective schematic view of the machine according to the present invention.
Figure 15:
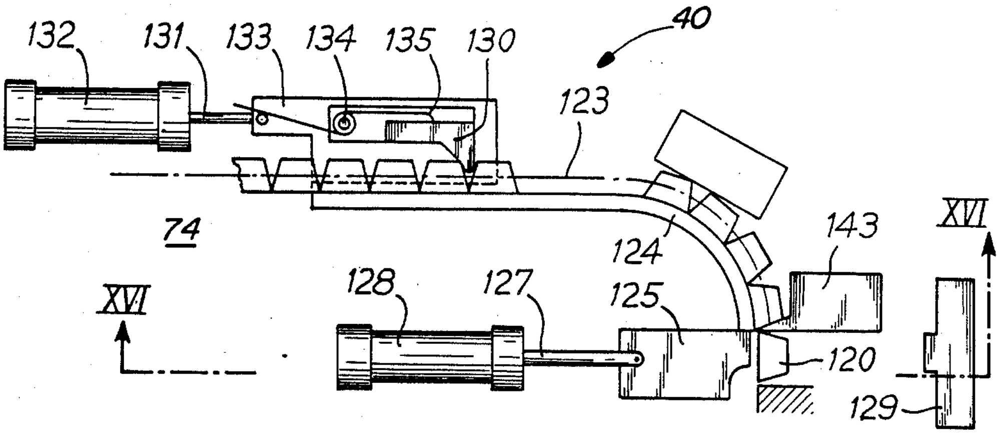
FIG. 15 illustrates a schematic plan view of the system for the advancement of the strip of thimbles shown in FIG. 14.
Figure 16:
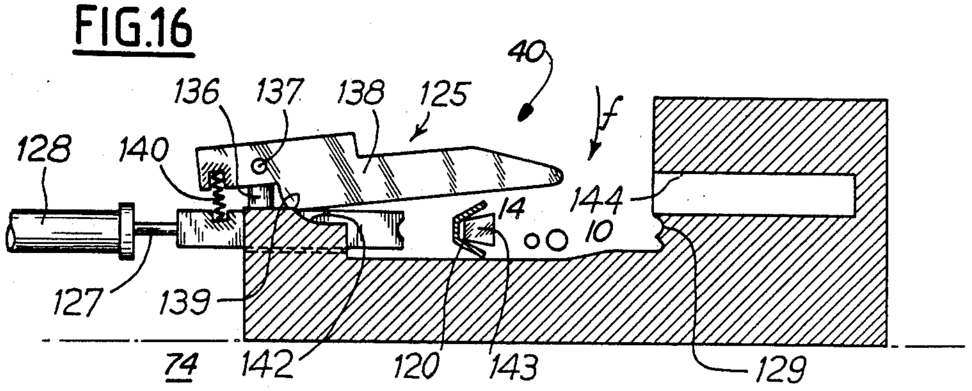
FIG. 16 illustrates a cross-sectional view taken along the line XVI—XVI of FIG. 15.
Figure 17:
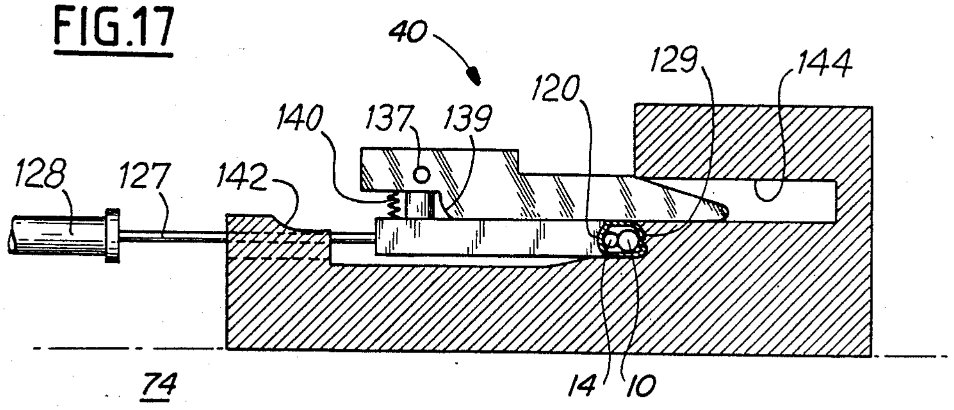
FIG. 17 illustrates a view similar to FIG. 16, showing the operation of the mounting tool of the present invention.

FIG. 3 is a diagram that illustrates a machine according to a preferred embodiment of the present invention. This machine comprises a loading station 20 adapted to receive, at inlets 22, different secondary conductors that are to be connected to the main conductors; a stripping station 30 for the conductors; station 40 for tightly mounting at least one secondary conductor on a main conductor; a station 50 for insulating the mounting; and finally a tape winding station 60 (shown in phantom lines). In the position depicted by FIG. 3, the details of mounting station 40 are not shown since it is there positioned directly beneath loading station 20. As will be more fully explained, mounting station 40 is movable together with carriage 74 from the position shown in FIG. 3. As will also be more fully described, the details of the mounting station are depicted in FIGS. 15–17.

Figures 11, 22:
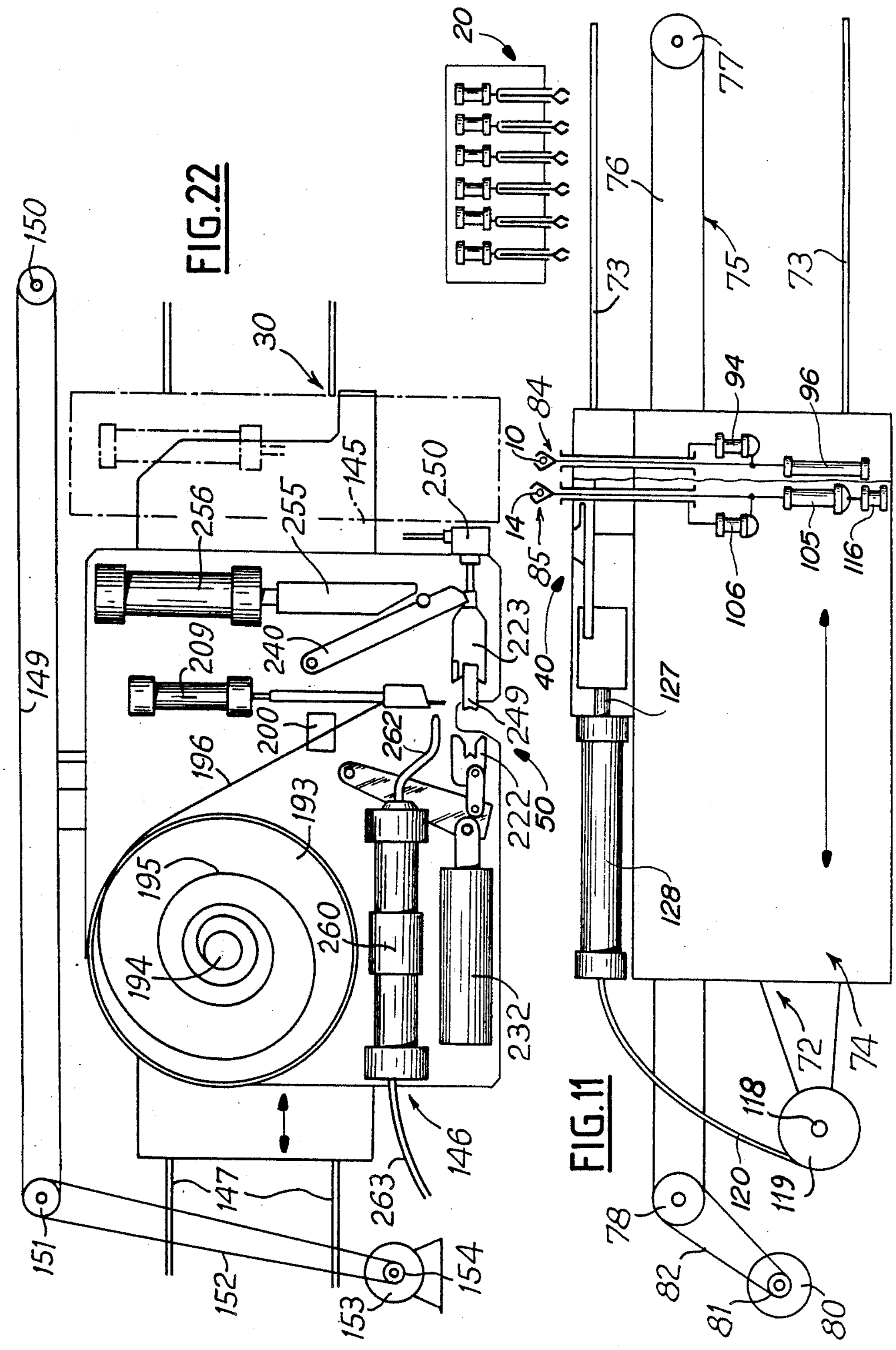
FIG. 11 illustrates a schematic elevational view of the mounting station of the, present invention.
FIG. 22 illustrates a schematic elevational view of the insulation assmebly for the mounting operation of the present invention.

The machine illustrated in FIG. 3 includes a frame 72 to which loading station 20 is affixed. Mounting station 40 is supported upon a carriage 74 which is guided substantially horizontally on frame 72 along rails 73. Reference can be had to FIG. 11 for an illustration of mounting station 40 and carriage 74 wherein the carriage 74 has been moved in a direction away from loading station 20.

Figure 18:
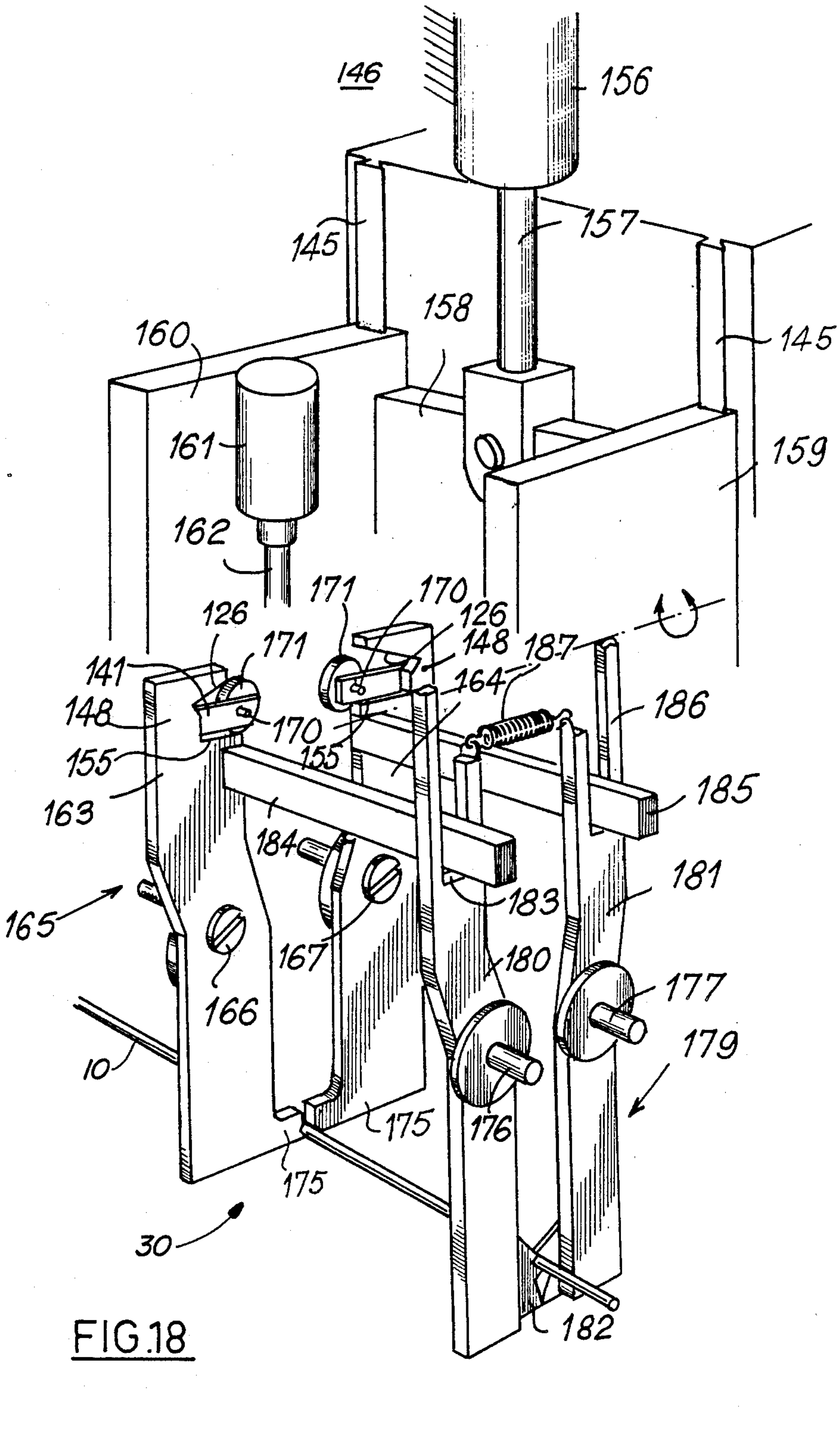
FIG. 18 illustrates a schematic perspective view of the stripping the present invention.

The machine illustrated in FIG. 3 also includes a carriage 146 which supports stripping station 30 and insulating station 50. Carriage 146, which is also illustrated in FIG. 22, is guided substantially horizontally on frame 72 along rails 147. Stripping station 30, which is also illustrated in FIG. 18 and in phantom in FIG. 22, is in addition to being guided substantially horizontally with carriage 146, is guided substantially vertically along rails 145.

Figures 30, 31, 32:
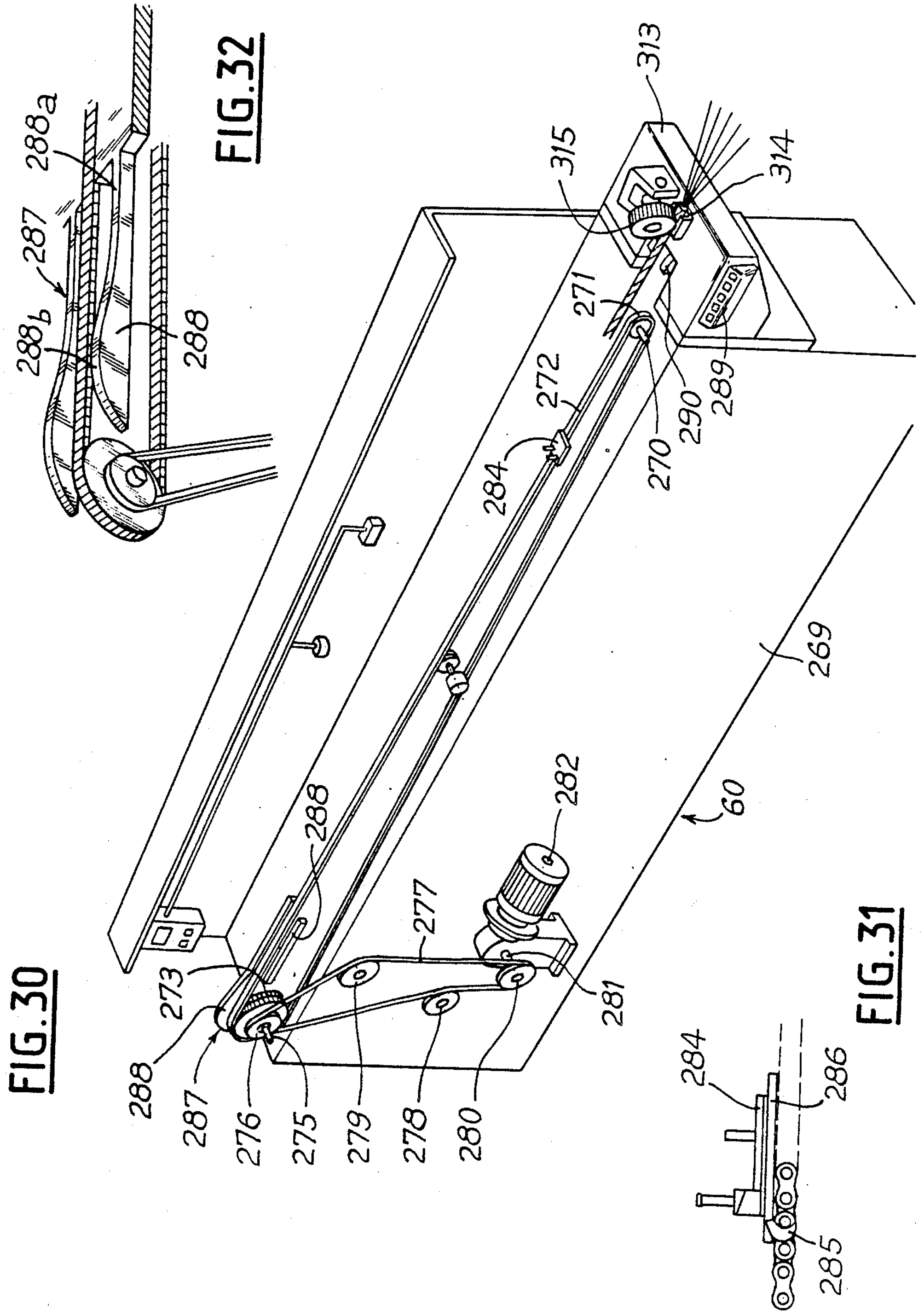
FIG. 30 illustrates a perspective view of the tape winding machine of the present invention.
FIG. 31 illustrates an elevational view of a detail of the apparatus of the present invention.
FIG. 32 illustrates a perspective view of a detail of the present invention.
Figure 34:
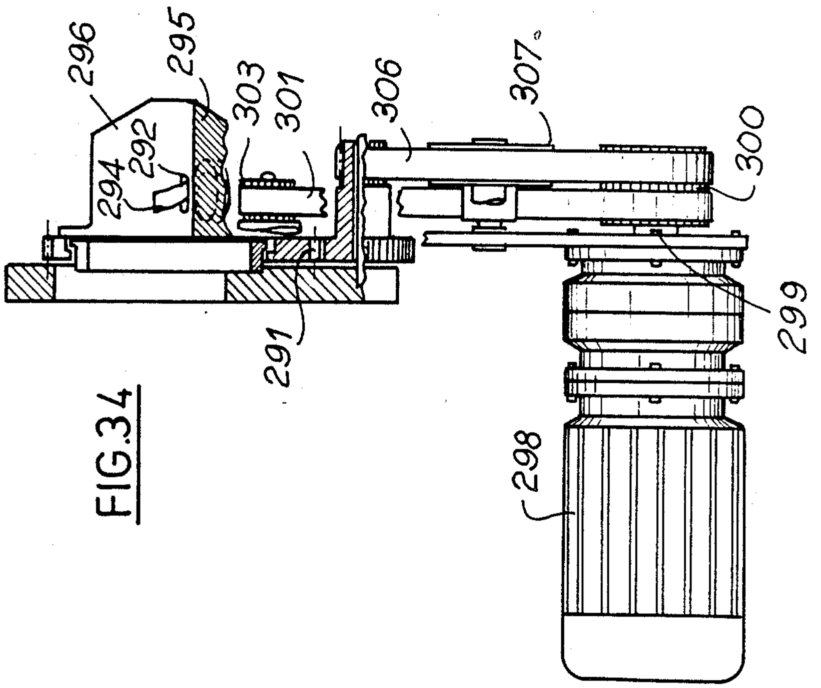
FIG. 34 illustrates a cross-sectional view taken along the line XXXIV—XXXIV of FIG. 33.

The machine illustrated in FIG. 3 also includes a tape winding station 60, shown in phantom in FIG. 3, adjacent to frame 72. Tape winding station 60 is also illustrated in FIG. 30.

Loading Station 20

Loading station 20 is shown in more detail in FIGS. 4, 5, 6 and 7 and comprises a box 21 having a plurality of inlets 22 each adapted to receive at least one secondary conductor 14, for example.

Figure 4:
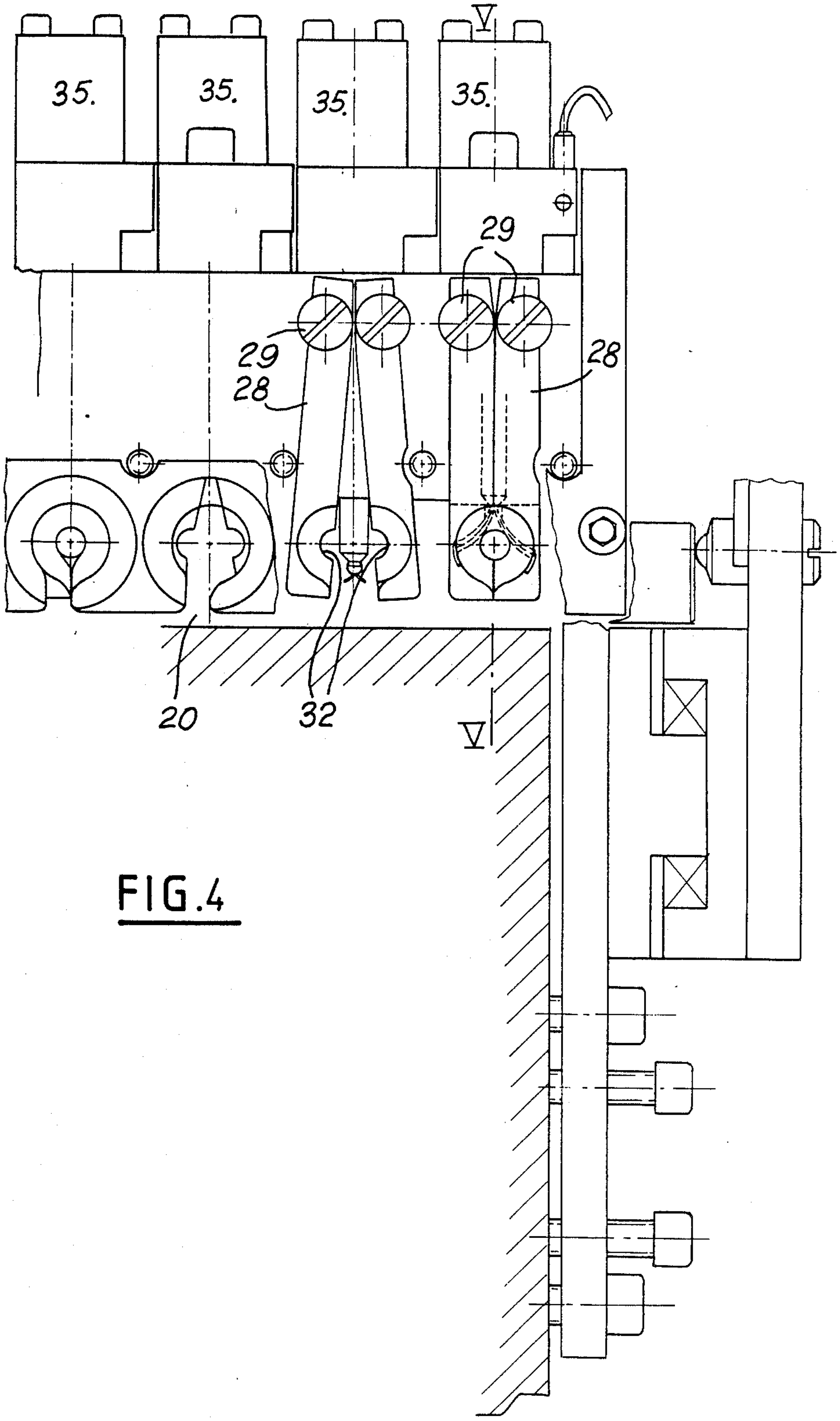
FIG. 4 illustrates a front elevational view of the loading station of the present invention.

Box 21 comprises a plurality of sets of pairs of stirrups 28 mounted to pivot on axes or shafts 29 as shown in FIGS. 4 and 6. Each stirrup comprises a web portion comprising a throat 32 having a generally semi-circular cross-section. The throat of each stirrup 28 faces the throat of a respective stirrup of the pair. Each pair of throats 32 comprise an inlet 22 which is adapted to receive a secondary conductor. Stirrups 28 are adapted to occupy two positions which are illustrated in FIG. 4; in one position they are spaced apart, (an aperture being formed along the lower edge of stirrups 28 permits passage of a secondary conductor in this position) and a closed position in which the two throats 32 in a pair form a continuous channel.

Figure 5:
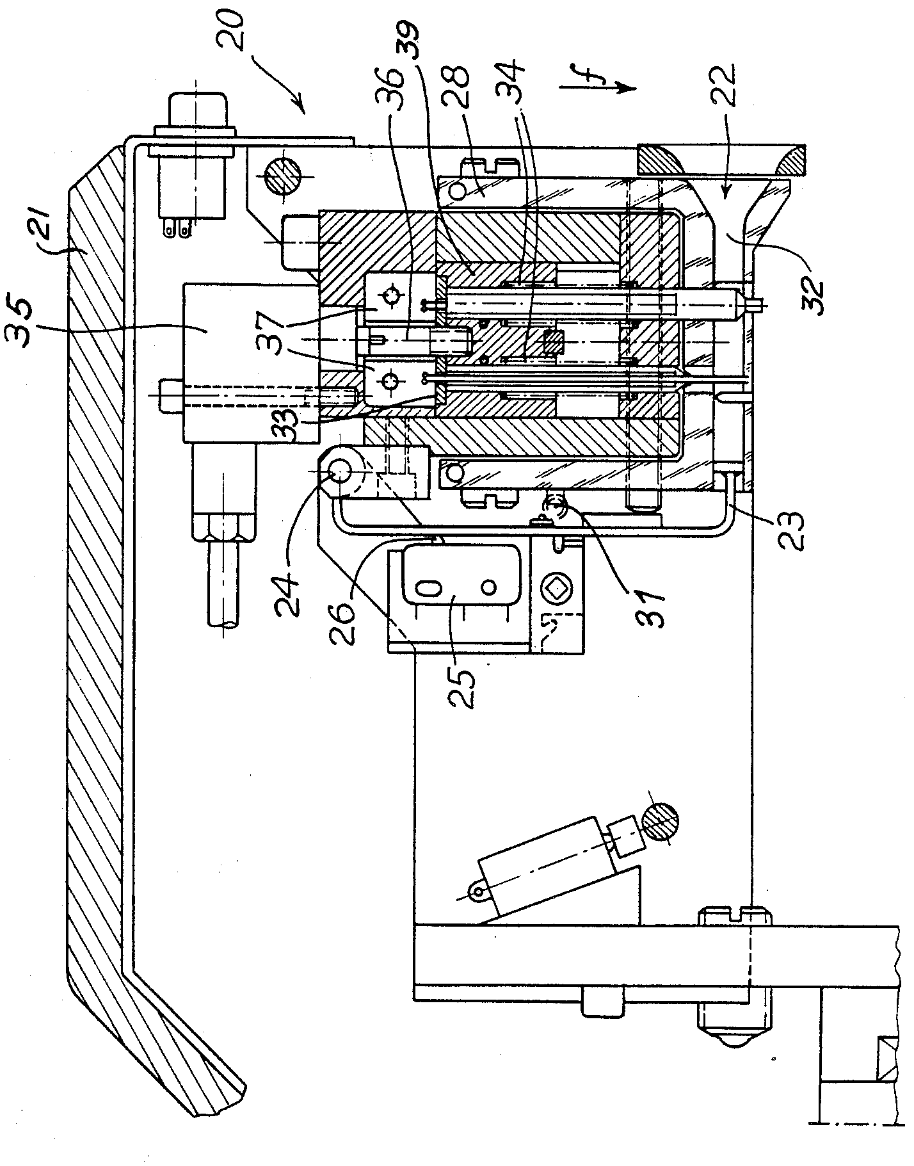
FIG. 5 a cross-sectional view taken along line V—V in 4.

Within box 21 a set of pneumatic jacks 35 is supported (FIGS. 4, 5, and 7). Jacks 35 comprise a piston rod 36 (FIGS. 5 and 7) integral with a small plate 33 to which are affixed tubular elements 39 slidably mounted in borings 34 of a fixed part of box 21. These tubular elements 39 engage ramps 42 (FIG. 6) provided on stirrups 28 in such a way that when elements 39 are thrust out of their initial position into an extended position in the direction shown by the arrow f in FIG. 5 they tend to move stirrups 28 apart, in opposition to the bias of a spring 31 tending to hold them against each other, so that the channel formed by throats 32 will be open at the bottom.

With reference to FIG. 7, box 21 also comprises plates 37 to which are affixed two pairs of elastic metallic rods 38, each pair passing through a tubular element 39 and terminating in cambered ends which form tongs 41 adapted to enclose a secondary conductor 14.

At the base of each channel formed by two adjacent throats 32 is a pallet 23, as shown in FIG. 5, pivotably mounted on a shaft 24 and bearing against a finger 26 of a micro contact 25. When micro contact 25 is subjected to the action of pallet 23, which is pushed by a secondary conductor 14, micro contact 25 closes a circuit, to which jack 35 is operatively associated, in such a way that piston rod 36 is moved in the direction shown by the arrow f in FIG. 5, thereby displacing tubular element 39 to move stirrups 28 apart and at the same time tightening tongs 41, which block or grip the secondary conductor 14. The path travelled by the piston rod 36 is such that when tubular elements 39 occupy their extreme extended position, the secondary conductor 14 is situated below the channel formed by the corresponding throats 32 of a pair of stirrups 28. The restoring springs 31 tend to return the stirrups 28 to the closed position.

Positioning and Guiding of Main Conductors

Figure 8:
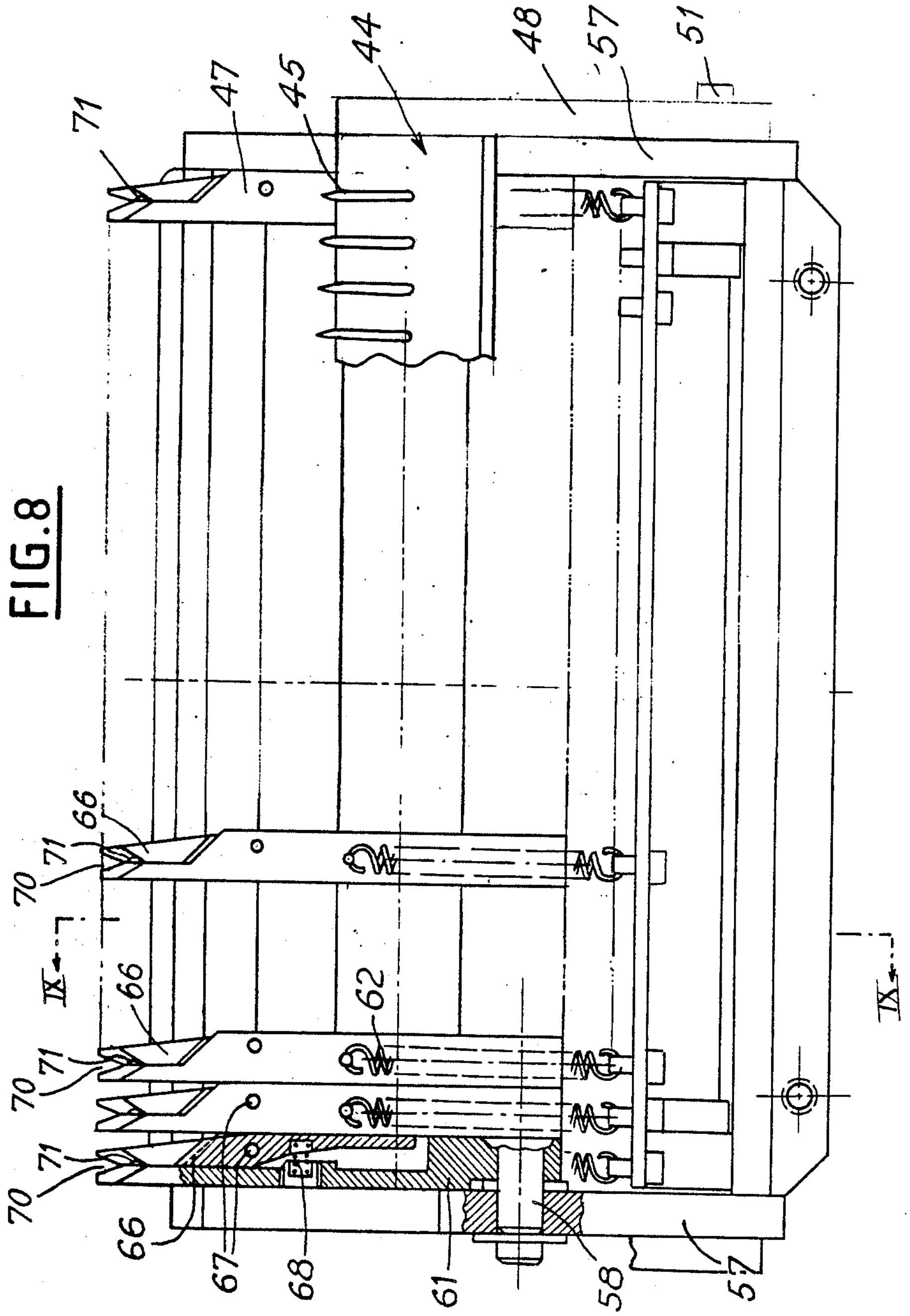
FIG. 8 illustrates an elevational view partly in cross-section of the comb of the stripping station of the present invention.
Figure 9:
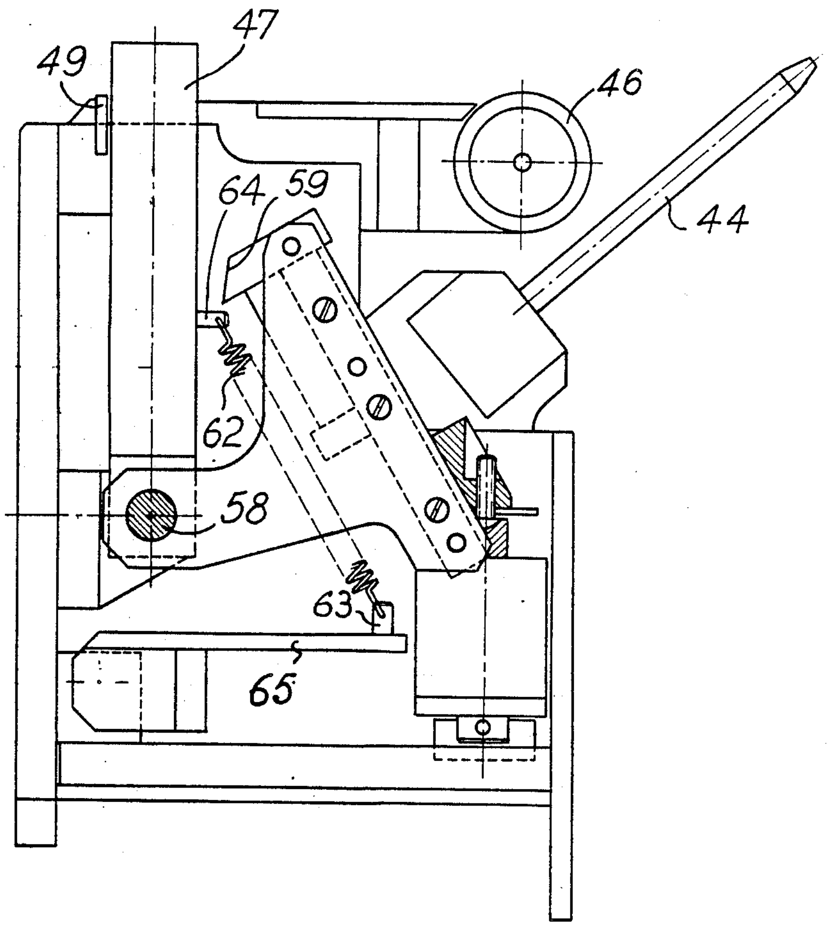
FIG. 9 illustrates a cross-sectional view taken along line IX—IX in FIG. 8.

As illustrated in FIGS. 8–10, the bundle of main conductors 10 is guided by a comb 44 having teeth 45 between which the main conductors 10 are positioned. The main conductors are guided on respective rollers 46 and then pass onto brakes 47, then over guide 316 (FIG. 30), and the box element 8, e.g. (FIG. 2), is then connected to a tape winding machine 60 (FIGS. 3 and 30), and which will be described in detail below.

Comb 44 is supported by a body 48 tiltably mounted on a shaft 51 supported by two cheeks 57 at stripping station 30 (FIG. 3).

With particular reference to FIG. 10, a spring 52 is provided for biasing body 48 against a stop 53. Body 48 bears against a contact 54 of a switch 55 adapted to interrupt the power supply circuit of the machine if the comb 44 tilts beyond a certain predetermined amount about shaft 51 in opposition to the action of spring 52. Roller 46 is rotatably mounted on a shaft 56 supported on cheeks 57. With particular reference to FIGS. 8 and 9, cheeks 57 also support a shaft 58 on which brakes 47 are mounted. Each brake 47 includes a body 61 mounted so as to pivot on shaft 58 between two stops 49 and 59 and in opposition to the bias of a spring 62 attached at one end to a lug 64 and attached at its other end to a lug 63 secured to a plate 65 extending between cheeks 57.

A limb 66 is journalled on a shaft 67 of body 61, and a compression spring 68 is enclosed within body 61 and limb 66 and biases brake 47 to its closed position.

The free end of body 61 and the free end of limb 66 are bevelled to form a V-shaped aperture 70 facilitating the introduction of the main electrical conductors so that the main conductors can be elastically gripped between body 61 and limb 66. Limb 66 is provided, on its face turned towards body 61, with a slot 71 which retains a conductor engaged therein as illustrated in FIG. 8.

Clamps and Tongs for Holding Main and Secondary Conductors

As illustrated in FIG. 11, the machine also comprises rails 73 supported by a frame 72 and on which movable carriage 74 is guided horizontally as shown by the double-headed arrow. This carriage 74 is connected to one of the strands 76 of a notched belt 75 which passes over pulleys 77 and 78 rotatably mounted on the frame of the machine (pulley 78 being driven by a belt 82 which engages a shaft 81 of a motor 80). Carriage 74 is provided with a pair of clamps 84 and a pair of tongs 85.

Figure 12:
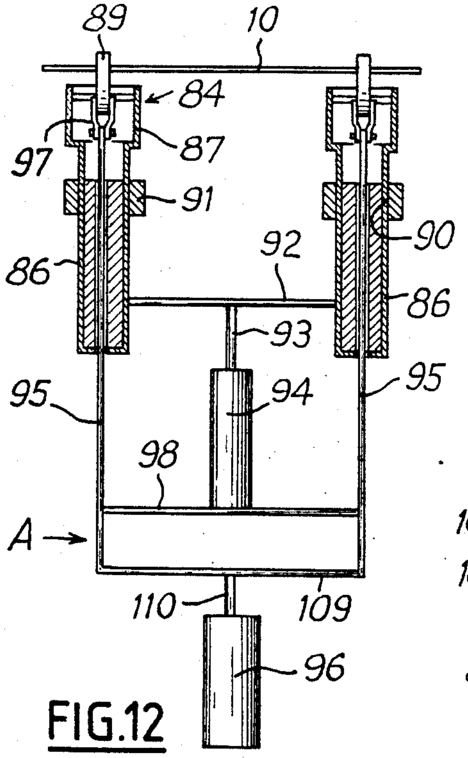
FIG. 12 illustrates a schematic view of the pair of clamps supported the movable carriage of the mounting station of the invention.
Figure 13:
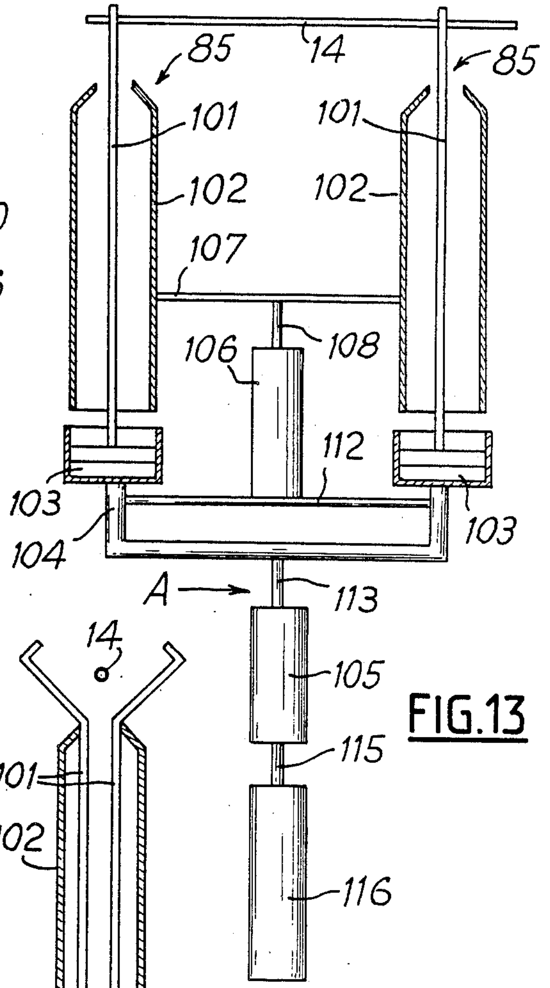
FIG. 13 illustrates a schematic view of the pair of tongs supported the movable carriage of the mounting station of the present invention.
Figure 12A:
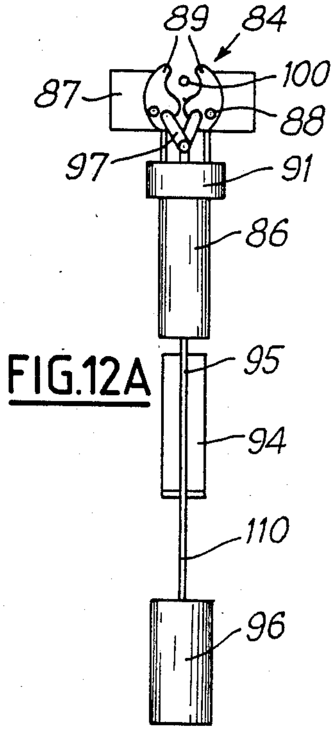
FIG. 12A illustrates a schematic view of a portion of the present invention in the direction shown by arrow A of FIG. 12.
Figure 13A:
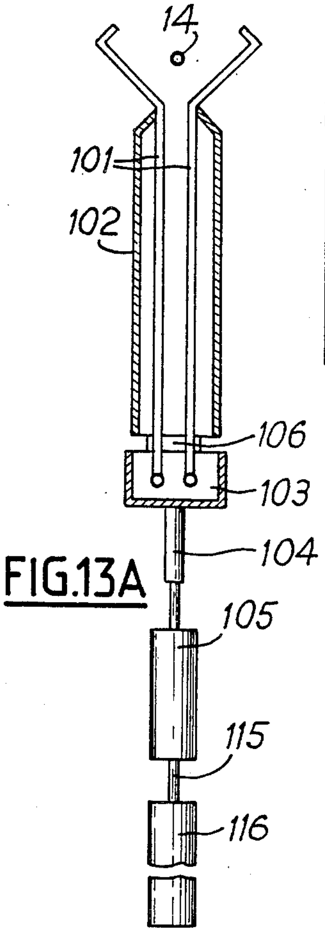
FIG. 13A illustrates a schematic view of a portion of the present invention in the direction shown by arrow A of FIG. 13.

As illustrated in FIGS. 11, 12 and 12A, a pair of clamps 84 are positioned outside the carriage, on each side of the latter, while FIGS. 13 and 13A shows a pair of tongs 85 positioned inside carriage 74 in such a way that the secondary conductor 14, which will thus be held in position by tongs 85, is adjacent to or extends as far as the vicinity of the main conductor 10 which will be held in position by clamps 84.

Each clamp 84 comprises a tubular element 86. The upper extremity of each clamp 84 supports an end strap 87 having flanges which are traversed by two shafts 88. A jaw 89 is journalled on each shaft 88. Each of the tubular elements are guided in a boring 90 of a lug 91, integral with carriage 74 and connected via a small plate 98 to two rods 95 themselves connected by a small plate 109 to a rod 110 of a jack 96.

Rods 95 are slidably mounted in tubular element 86 and comprise at their free end two connecting rods 97 journalled on the heels of jaws 89, thus causing the jaws to open and close. Jack 96 raises and lowers the clamp assembly while jack 94 opens and closes jaws 89.

As illustrated in FIGS. 13 and 13A, tongs 85 each comprise two elastic metal rods 101 which pass through a tubular element 102 and are affixed to a small plate 103 supported by a rod 104 of a jack 105. Each tubular element 102 is connected by a small plate 107 to a rod 108 of a jack 106. Jack 106 is connected, by a small plate 112 to small plates 103, which are themselves connected by a bar 104 to a rod 113 of a jack 105. Jack 105 is supported by a rod 115 of a piston of a jack 116 integral with carriage 74.

Jacks 105 and 116 displace tongs 85 vertically over a considerable distance, while jack 106 opens and closes the tongs.

Mounting Station 40

Figure 14:
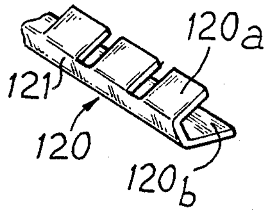
FIG. 14 illustrates a perspective view of a piece of the strip of thimbles of the present invention.

As illustrated in FIGS. 11 and 14 frame 72 comprises a shaft 118 on which is mounted a reel 119 with a strip of thimbles 120 wound around it. Thimbles 120 are each formed by a metal piece substantially U-shaped with two flanges 120*a* and 120*b* and a web 121, the thimbles being positioned adjacent one another by the prolongation of web 121.

FIG. 15 illustrates, in plan view, the upper part of carriage 74 which includes a slideway 123 in which a strip of thimbles 120 is guided. The slideway includes a curved part 124 at the end of which a tool 125 extends. Tool 125 is formed by a punch adapted to engage web 121 of thimble 120 and to cut thimble 120 in order to separate it from the other thimbles. Tool 125 is supported by a rod 127 of a jack 128. Opposite tool 125 is an anvil 129 serving to turn back the free ends of the flanges 120*a* and 120*b* against a main conductor 10 and a secondary conductor 14 and thus form a splice by tightly mounting them thereon.

The strip of thimbles 120 is moved step-by-step in slideway 123 by a catch 130 which engages the corresponding edge of flanges 120*a* and 120*b* and which is mounted on a shaft 134 in such a way as to pivot against the bias of a spring 135 on a slide 133 integral with a rod 131 and a piston of a jack 132. The movement of slide 133 in one direction will release catch 130, while its movement in the opposite direction will push the strip over a distance corresponding to that of a thimble 120.

Tool 125 and anvil 129 are shown in FIGS. 16 and 17 in a greater detail. As can be seen from these diagrams, tool 125 comprises a finger 136 on which is journalled a lever 138. Lever 138 has a front portion which is biased by a spring 140 to rotate in the direction shown by the arrow f. Lever 138 also comprises a heel 139 which can engage a ramp 142 in such a way as to pivot in the direction opposite to that shown by the arrow f in response to rearward linear displacement of lever 138 from its position in FIG. 17 to its position in FIG. 16.

Opposite slideway 123, in the part of the machine corresponding to that in which thimble 120 is to be cut in order to separate it from the other thimbles on the strip, a fixed knife 143 is provided. In the part of the machine situated above anvil 129 a slit 144 is provided into which the corresponding end of lever 138 is inserted. At the moment of the tight mounting operation thimble 120 is thus satisfactorily secured, thereby preventing the formation of a burr.

Stripping Station 30

FIGS. 18–21 show stripping station 30 for stripping an intermediate portion of the main conductor. This stripping station is described in U.S. Application Ser. No. 07/031,840, now U.S. Pat. No. 4,793,221 issued 12-27, 19 which is hereby incorporated by reference. Stripping station 30, shown in phantom lines in FIG. 22, is mounted to move substantially vertically on slideways 145 (FIG. 18) of a second horizontally movable carriage 146 (FIGS. 3 and 22). Second carriage 146 is mounted to move substantially horizontally on rails 147 supported by frame 72 as shown by the double-headed arrow in FIG. 22. Second carriage 146 is also connected to one strand of a belt 149 which passes over pulleys 150 and 151. Pulley 151 is driven by a belt 152 guided by a pulley 154, which is keyed on a shaft of a motor 153.

Figure 19:
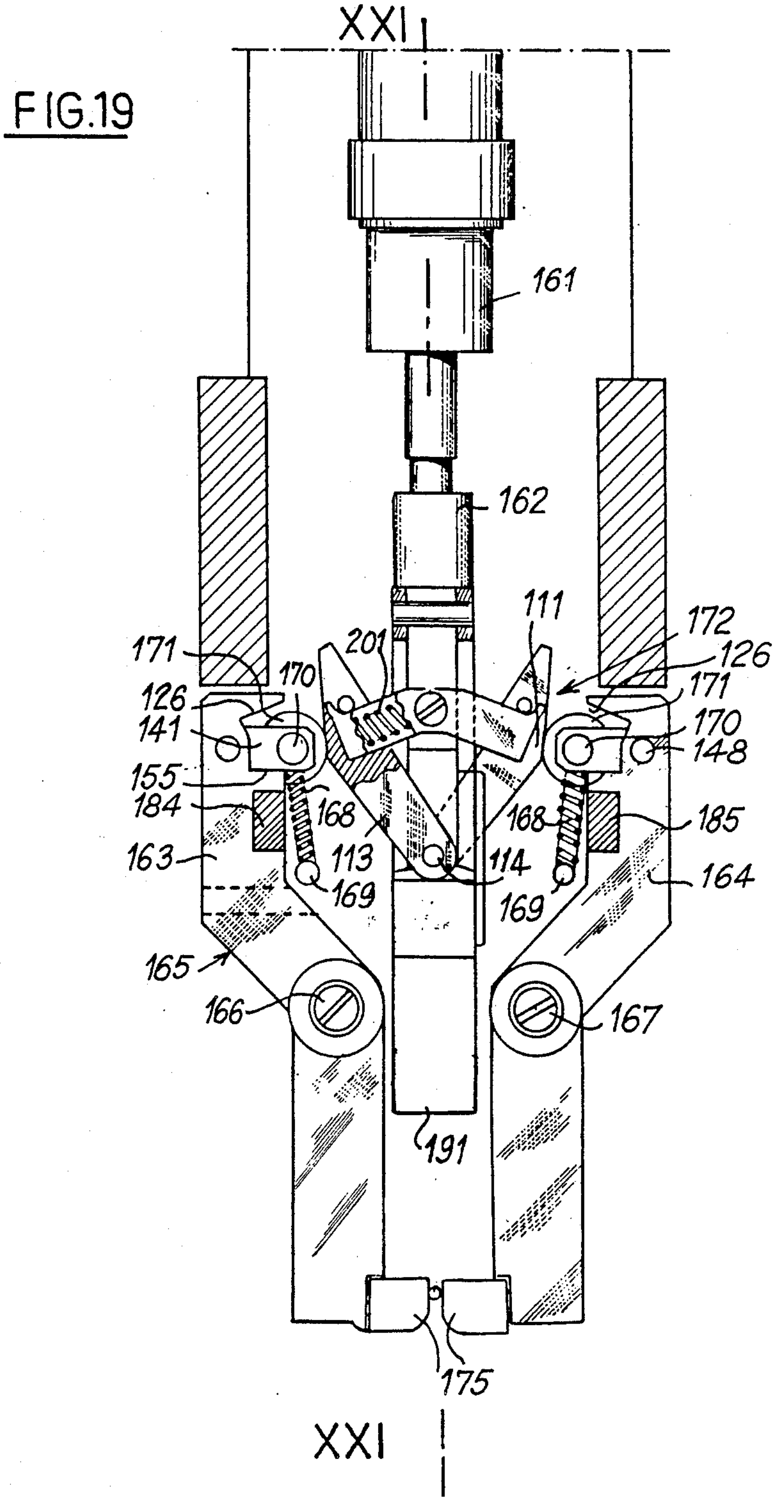
FIG. 19 illustrates an elevational view showing the securing clamps of the present invention.
Figure 20:
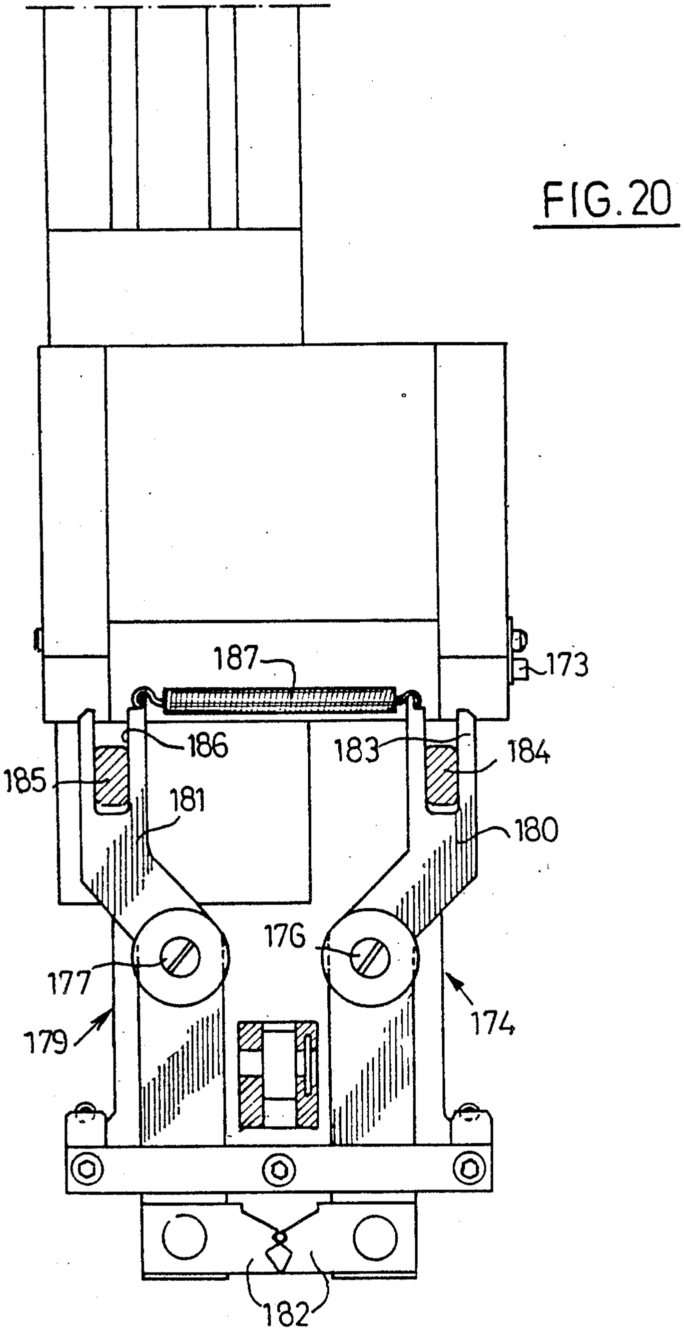
FIG. 20 illustrates an elevational view showing the tongs adapted to notch the sheath of the main conductor of the present invention.

Stripping station 30 is mounted for vertical movement as follows. To second carriage 146 is affixed the body of a jack 156. Piston rod 157 of jack 156 is connected to a plate 158 interconnecting two cheeks 159 and 160 which are substantially vertically movable along rails 145. Cheek 160 supports a jack 161. Second carriage 146 also comprises a clamp 165 adapted to grip a main conductor 10 between its jaws 175. Clamp 165 also comprises two limbs 163 and 164 journalled on shafts 166 and 167 of cheek 160. Limb 163 bears a lever 141 journalled to a shaft 148 and bears a roller 171 rotatably mounted on a shaft 170. Lever 141 is held against a stop 155 by a spring 168 inserted between the lever and a teat 169. A second stop 126 is provided to limit the movements of lever 141, as illustrated in FIG. 19. The same construction is adopted at the corresponding end of limb 164.

Jack 161 comprises a rod 162 on which is mounted a cam 172 (FIGS. 19) adapted to engage rollers 171 in order to close clamp 165. Cam 172 comprises two levers 111 and 113 which are journalled on a shaft 114 borne by rod 162 and which are biased apart by springs 201.

As illustrated in FIGS. 18–21 cheek 159 comprises a plate 174 which is tiltably mounted on a shaft 173 on carriage 146. Plate 174 supports limbs 180 and 181 of a stripping clamp 179. Limbs 180 and 181 are journalled on plate 174 by shafts 176 and 177. The free ends of clamp 179 are provided with knives 182 adapted to notch the insulating sheath of a main electrical conductor 10.

The end of limb 180 which is opposite from that provided with knife 182 includes a fork 183 in which a bar 184 is inserted. Bar 184 is integral with limb 163 of clamp 165.

The end of limb 181 of stripping clamp 179 corresponding to the end of limb 180 having fork 183 includes a fork 186 in which a bar 185 is inserted. Bar 185 is integral with limb 164 of clamp 165. A draw spring 187 is inserted between forks 183 and 186 and biases and displaces knives 182 and clamps 165 apart.

Shafts 166 and 176 are coaxial, as are shafts 167 and 177.

Figure 21:
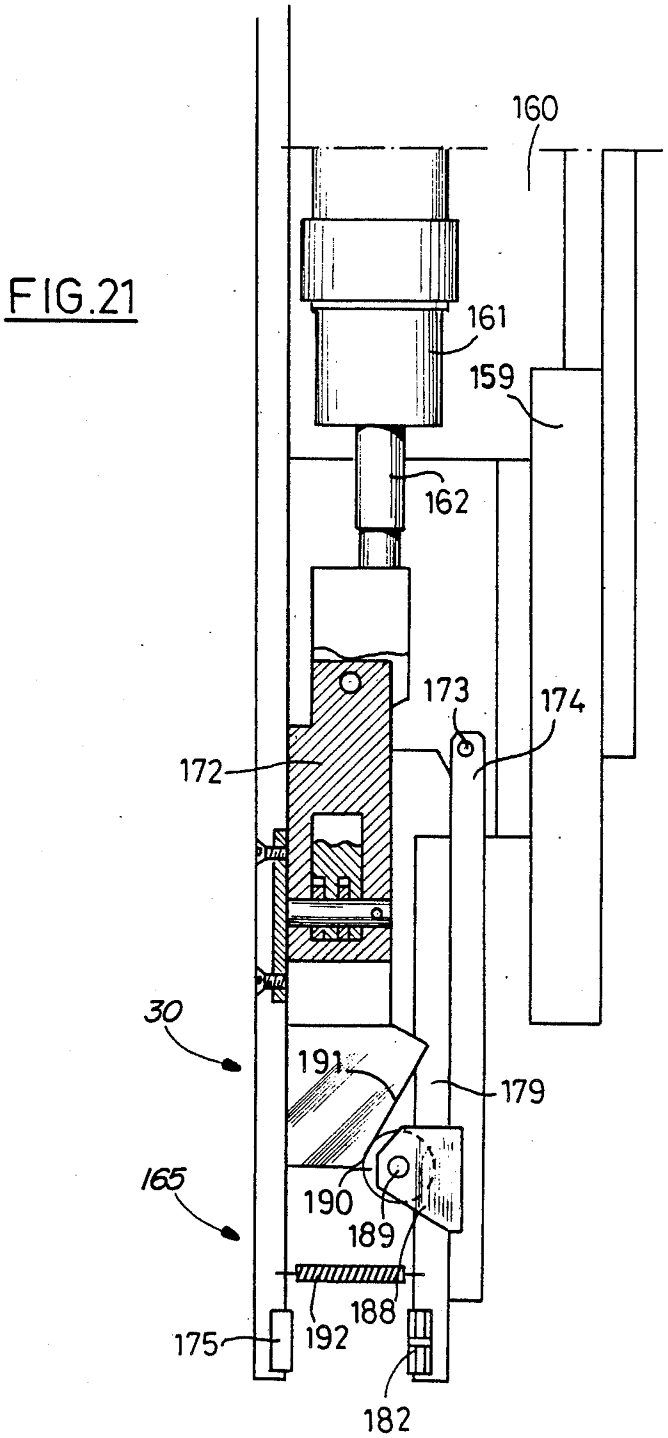
FIG. 21 illustrates a cross-sectional view taken along line XXI—XXI . 19.

Plate 174 also supports an end strap 188 which extends between the two branches of clamp 179 in the vicinity of knives 182. The flanges of strap 188 are traversed by a roller 190 adapted to engage a cam 191 provided at the free end of rod 162 of jack 161, as seen in FIG. 21.

It will thus be seen that when rod 162 descends, cam 172 Will tighten clamp 165, so that its jaws 175 will enclose a main conductor 10, while simultaneously tightening clamp 179, thereby causing knives 182 to notch the insulating sheath of the main conductor 10.

Clamps 165 and 17 tighten simultaneously, because they are interconnected by bars 184 and 185. As rod 162 of jack 161 continues to descend, cam 191 extending in a plane perpendicular to cam 172 will encounter roller 190, thereby causing plate 174 to tilt on shaft 173 in opposition to the bias of a spring 192. Because clamp 179 is kept closed and knives 182 are designed to cut nothing but the insulating sheath of the main conductor 10, the tilting movement of plate 174 causes knife 182 to be displaced along the insulating sheath of the conductor, thereby causing the notched insulating sheath of the main conductor to slide and be compressed on the core of the conductor, so that a bare portion will be formed on the conductor. Rod 162 then continues its descent until rollers 171 escape cam 172. In this position clamps 165 and 179 will open suddenly in order to release the partly stripped conductor. When rod 162 of jack 161 is returned to its initial position rollers 171 will be moved out of the way, and levers 141 will tilt in opposition to the bias of the springs 168, in order to come to rest against stops 126.

The main conductor 10, of which a portion has been stripped, is taken up by clamps 84 and is conveyed to the vicinity of or substantially adjacent to the secondary conductor 14 which is held by tongs 85 and which has first been gripped by tongs 85 in the course of the movement of the carriage 74, as is illustrated in FIG. 11. The end of the secondary conductor 14 can be stripped prior to its insertion at loading station 20 by conventional means. The stripped parts of the secondary conductor 14 and of the main conductor 10 are held side-by-side while the corresponding thimble 120 is tightly mounted on the conductors. The thimble is therefore assembled on the conductors at the same time that the electrical connection is effected. However, the process in not yet completed. Means must be provided for reliably insulating the splice thus produced on the main conductor.

Insulating Station 50

Figure 23:
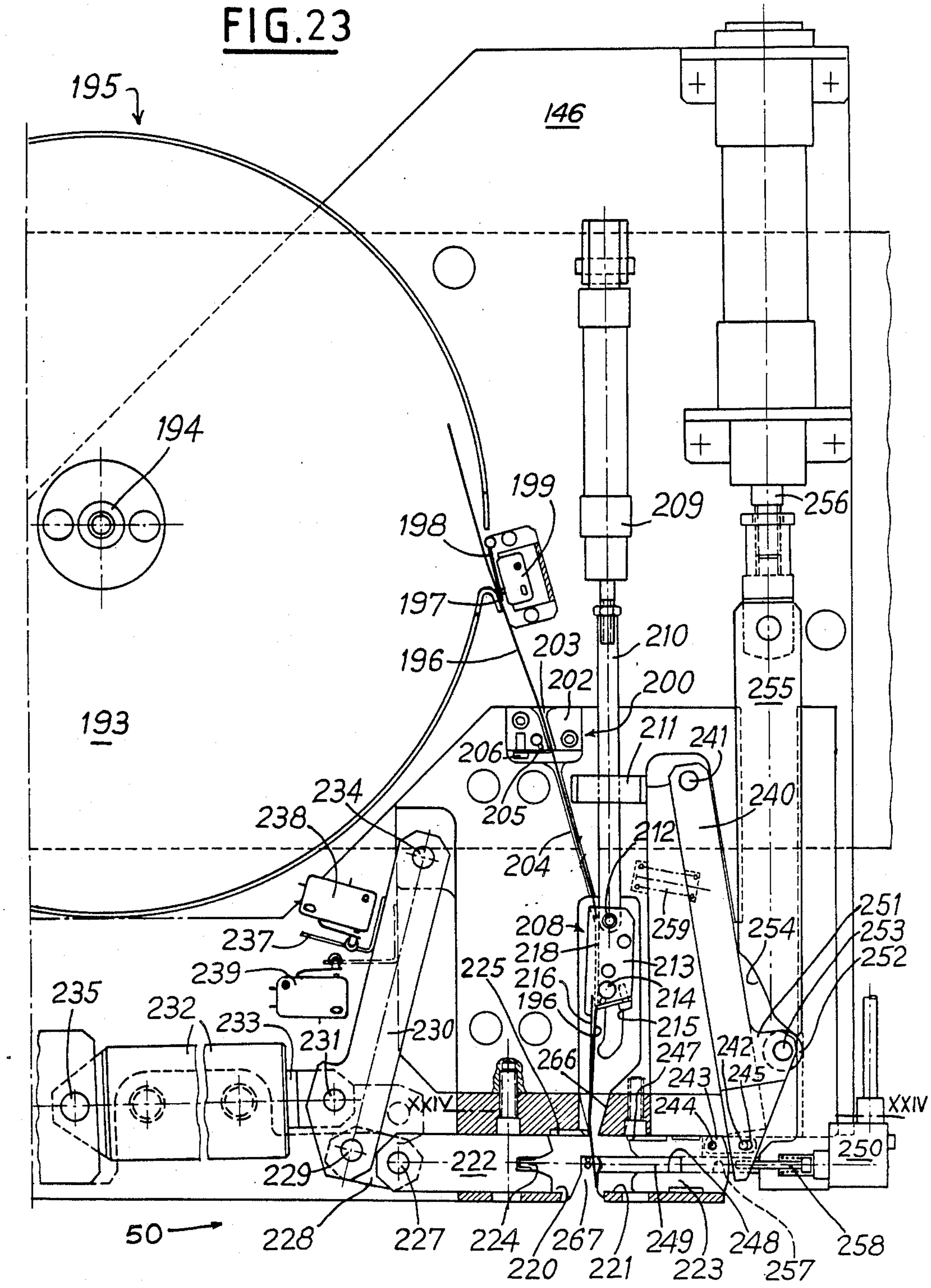
FIG. 23 illustrates a side view, on an enlarged scale, of the splice insulating station of the present invention.
Figure 24:
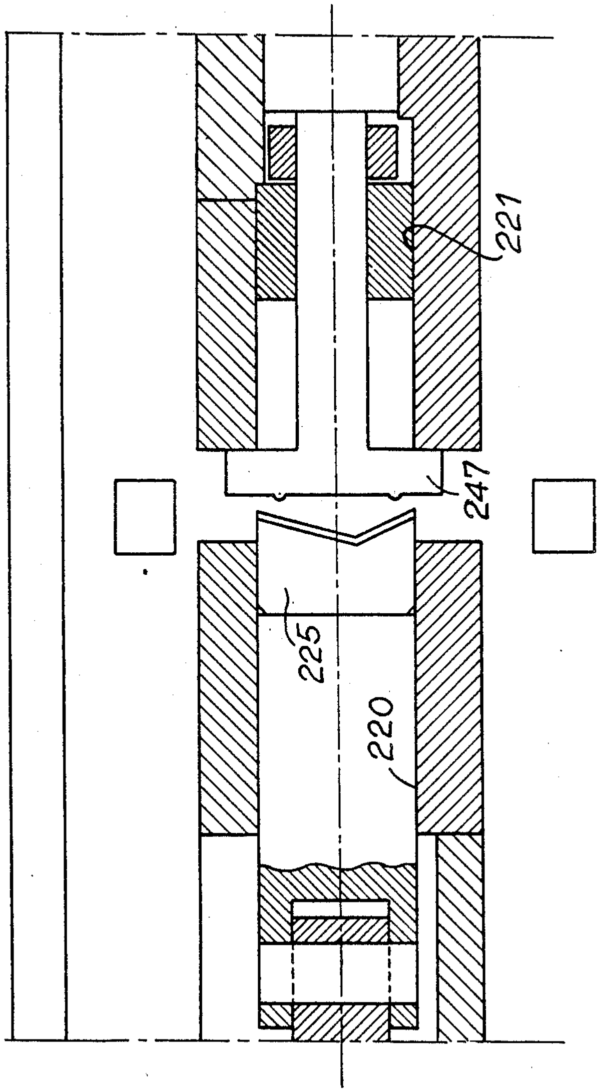
FIG. 24 illustrates a cross-sectional view taken along the line XXIV—XXVI of FIG. 23.

Second carriage 146 includes means for effecting insulation of the splice. The second carriage 146 includes, as illustrated in FIGS. 22 and 23, a receptacle 193 provided with a shaft 194. A reel 195 of a strip of plastic material 196, adapted to undergo deformation when cold, is mounted on shaft 194.

Receptacle 193 includes a passage 197 for permitting a strip of material 196 to pass therethrough. Receptacle 193 also includes spring blades 198, adapted to engage a finger of a switch 199 for indicating the absence of the material. Blades 198 come to rest against the passage and the strip of material.

Strip of material 196 is then guided through an anti-return brake 200 including a body 202 with a slit 203 through which the strip passes. The lower face of body 202 includes a spring blade 205 affixed to body 202 by a screw 206. Blade 205 partly straddles the end of slit 203 in such a way as to enable strip 196 to advance but preventing strip 196 from moving in the reverse direction. From blade 205 strip 196 is guided in a slit 204 in second carriage 196 and is taken up by a feed control device 208.

Feed control device 208 includes a jack 209 which is affixed to second carriage 146. Jack 209 includes a piston rod 210 which is guided in a boring 211 in carriage 146. Feed control device 208 supports a slide 213 journalled on a shaft 212 and includes a slit 218 in which strip of material 196 is guided. Slide 213 is prolonged by a flexible blade 216. The lower end of blade 216 is provided with an aperture 217. Slide 213 includes a teat 214 guided in a longitudinal slit 215 in carriage 146.

The lower part of carriage 146 includes two coaxial slideways 220 and 221. A punch 222 is guided in slideway 220, while a die 223 is guided in slideway 221.

The end of punch 222 which is turned towards guide or die 223 is provided with a mark or marking or shaping element 224 for shaping piece of material 196 as will be explained below. The upper edge of punch 222 is integral with knife 225, while its other end is journalled to a shaft 227 and one end of a connecting rod 228. The other end of rod 228 is journalled on a shaft 229 supported by a lever 230. Lever 230 is journalled on a shaft 234 of second carriage 146. Lever 230 is connected by a shaft 231 to a rod 233 of a jack 232 tiltably mounted on a shaft 235 supported by carriage 146. Lever 230 bears a lug 237 adapted to engage, in its two extreme positions, two end-of-end travel contacts 238 and 239.

On second carriage 146 an arm 240 is journalled to a shaft 241, against the bias of a spring 259. Arm 240 transports an end strap 251 supporting a shaft 253 on which a roller 252 is rotatably mounted. Roller 252 is adapted to engage a cam 254 provided at the free end of a rod 255 of a jack 256.

Arm 240 includes a teat 242 which engages a longitudinal slit 245 of a connecting rod 243 journalled to die 223 by a shaft 244. Die 223 includes a mark or marking or shaping element 248 and a knife 247 adapted to engage knife 225 by sliding under the lower surface of the latter. Die 223 is traversed by a channel 257 in which a push rod 249 is guided. Push rod 249 is supported by the free end of a rod 258 of a jack 250 attached to carriage 146.

As is illustrated in FIGS. 3, 22, 23, and 26–29, second carriage 146 supports a support 260 in which is mounted a cartridge 261 of a pasty insulating product, such as silicone or a silicone containing product. Cartridge 261 includes a distribution tube 262 which terminates on strip of material 196 opposite aperture 217 of the blade 216.

Cartridge 261 is connected by a tube 263 to a source of compressed air 264. A timing device 265 is provided in order to convey a certain pressure into the cartridge for a certain period so that a drop of the pasty product will be deposited on strip of material 196. These elements are illustrated in FIG. 3.

A cavity 267 is provided between slideways 220 and 221, while a passage 266 for strip of material 196 is provided between the slide 213 and cavity 267.

Figure 26:
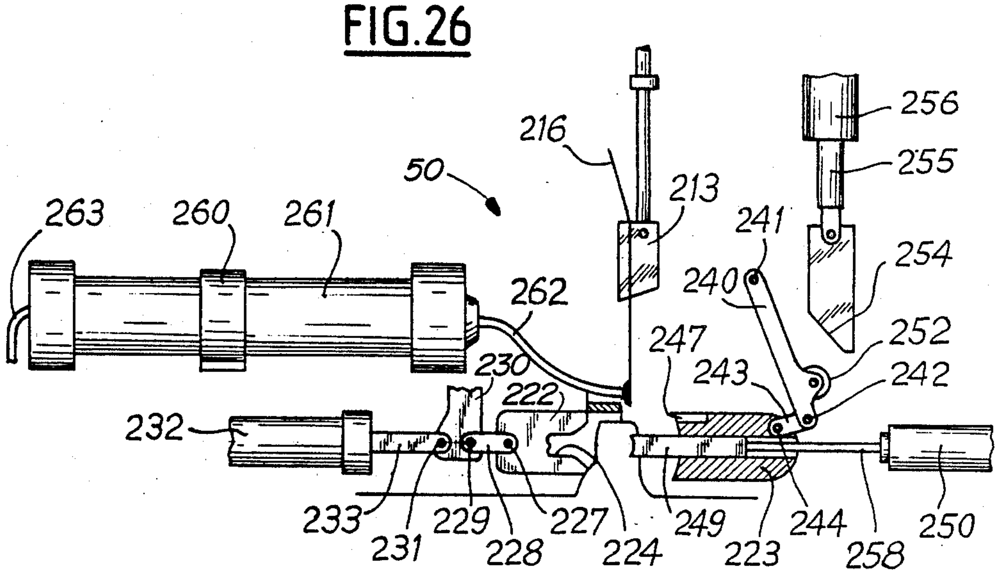
FIGS. 26, 27, 28, 29 illustrate schematic views showing the operation and structure of the splice insulating system of the present invention.
Figure 27:
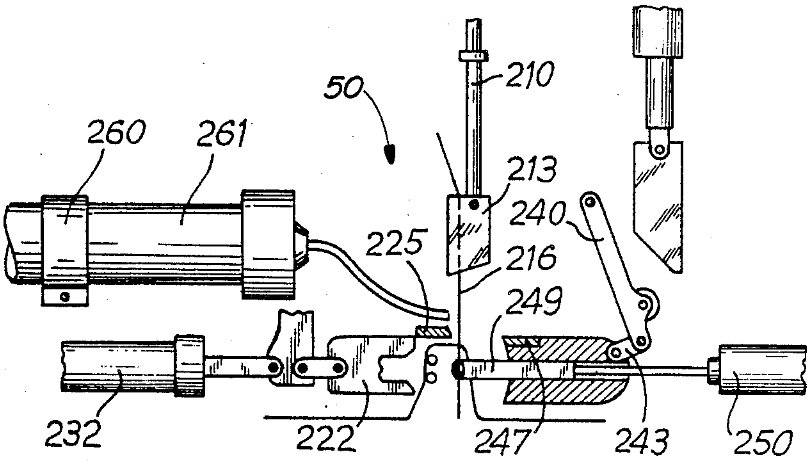
Figure 28:
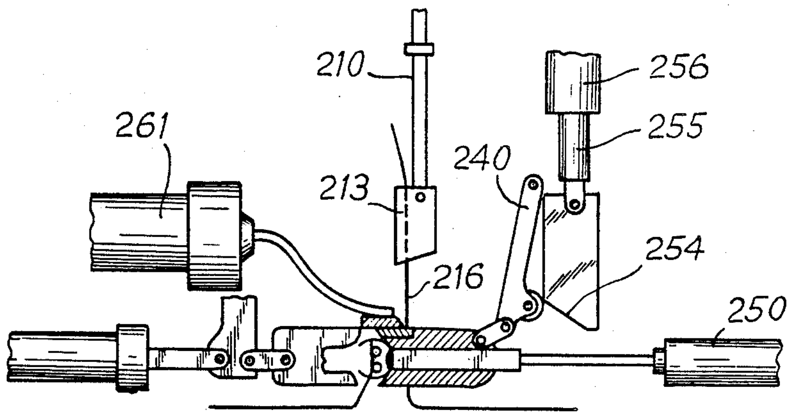
Figure 29:
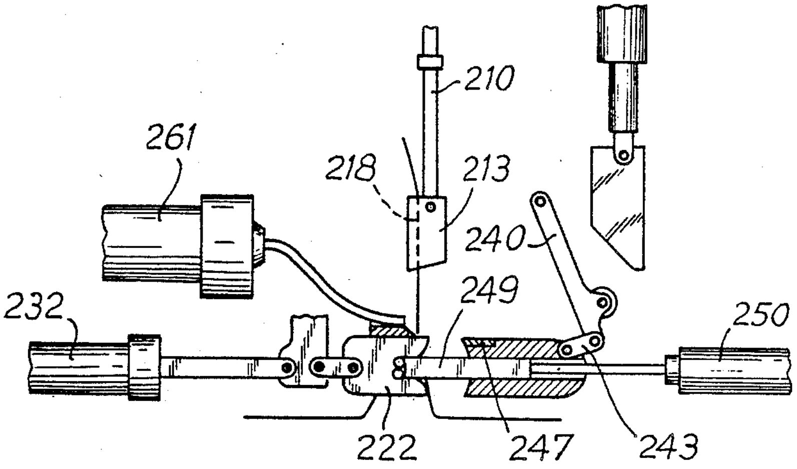

The operation of the splice insulating means is clearly shown in schematic FIGS. 26–29; its relationship with respect to other parts of the apparatus is shown in FIGS. 3, 11, 12, 22, and 23. As seen in these drawings the main conductor 10 is secured by clamps 84. Carriage 146 is displaced in relation to carriage 74 in such a way that clamps 84 are positioned opposite cavity 267. Clamps 84 are then moved upwardly by jack 96 in such a way that the splice is positioned in the cavity. A drop of pasty product 268 is placed on strip of material 196 and jack 209 is displaced in such a way that slide 213 conveys that end of the strip 196 which is provided with the drop of pasty product 268 into cavity 267. Jack 250 is then displaced in such a way that push rod 249 holds strip 196 against the splice (FIG. 27), while jack 256 is actuated. As a result, cam 254 of rod 255 of jack 256 causes arm 240 to tilt against the bias of spring 259, thereby engaging knife 247 and knife 225 to cut strip 196, while mark 248 of die 223 deforms the strip in order to give it a substantially reversed U configuration so that the branches of the U come to rest opposite mark 224 as illustrated in FIG. 28. Jack 232 is then actuated, as is illustrated in FIG. 29, in such a way that punch 222 is displaced and the branches of the U are tightly mounted over the splice by mark 224. The different jacks 232, 250 and 256 are then returned to their initial positions while clamps 84 are opened and retracted downwardly. Jack 209 is also returned upwardly in order to commence a fresh cycle.

Tape Winding Station 60

FIGS. 30–34 show the tape winding machine 60, shown in phantom in FIG. 3, which includes a framework 269 on one end of which a shaft 270 is mounted. Shaft 270 supports a rotating pulley 271 over which an endless chain 272 passes. Chain 272 is driven by a pinion 273 keyed onto a shaft 275. A pulley 276 is also keyed onto shaft 275. Pulley 276 is driven by a belt 277 which passes over tension rollers 278 and 279 and is driven by a pulley 280 keyed onto an output shaft 281 of a reduction motor unit 282.

Chain 272 is adapted to receive traction claws 284 which comprise open hooks 285 integral with a plate 286. Hooks 285 extend by an ample or substantial distance beyond the edges of the chain. In addition, hooks 285 engage only the axles of chain 272 as illustrated in FIG. 31.

At that end of tape winding machine 60 which is adjacent shaft 275 is an ejector 287 which includes two cheeks 288, positioned on the two sides respectively, of chain 272, at a distance less than the width of the plate 286. Checks 288 further include an inclined part **288*a* and a curved part 288*b* connected to inclined part 288*a*. As a result, when claws 284 approach ejector 287, the lower part of plate 286 engages inclined parts 288*b* and plate 286 rides up inclined parts 288*b*, thereby disengaging hooks 285 of chain 272 from claw 284 so that the box element is ejected from tape winding machine 60**.

Figure 33:
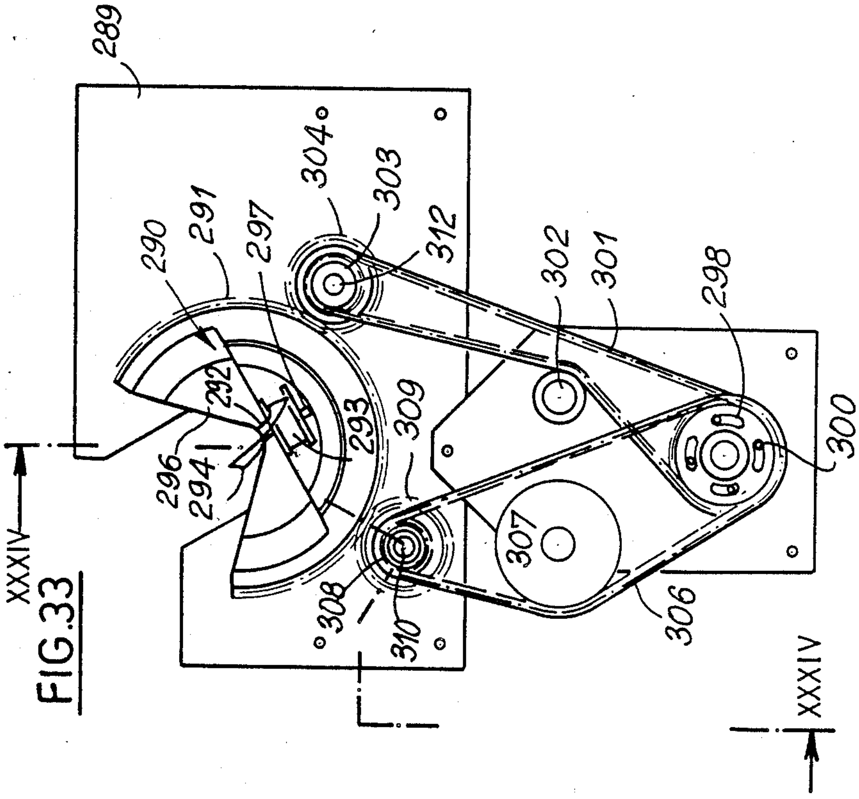
FIG. 33 illustrates an enlarged elevational view of the tape winding head of the present invention.

With particular reference to FIG. 33, the front end of framework 269 includes a plate 289 bearing a tape winding head 290. Tape winding head 290 includes a body 295 provided with a toothed sector 291 and a substantially V-shaped support 296 perforated with a slit 292. A tape 294 extends through slit 292 and is wound onto a reel 293 mounted on a shaft 297 of framework 269.

Framework 269 also supports a motor 298 which drives a shaft 299. A notched pulley 300 is keyed to shaft 299 which drives a notched belt 301. Belt 301 also engages a notched pulley 303 keyed onto a shaft 312. A pinion 304 is keyed on shaft 312. In addition, pinion 304 engages the teeth of sector 291. Shaft 312 is supported by plate 289, as is a roller 302 which engages belt 301 and is provided in order to ensure the required tension for belt 301.

Pulley 300 also drives a second notched belt 306. Belt 306 engages a notched pulley 308 keyed onto a shaft 310. A pinion 309 is keyed onto shaft 310. Pinion 309 includes teeth which engage the teeth of sector 291. A roller 307 is also provided on plate 289 in order to ensure the required tension for belt 306.

Pinions 304 and 309 are identical, as are pulleys 303 and 308 so that the pinions will rotate synchronously and at the same speed.

In front of tape winding head 290 is a table 313 having a channel 314 for guiding the conductors and moving them closer to each other. Table 313 further includes a presser roller 315 adapted to maintain the conductors in the channel.

The operation of tape winding machine 60 will now be explained. A box element 8, e.g., attached to a bundle of conductors is attached to claws 284 which are driven by chain 272. The conductors are displaced by chain 272 into channel 314, where they are brought together. The free end of strip 294, which extends above support 296, is then placed on the conductors, after which sector 291 is driven by motor 298, thereby causing the tape to be deposited helicoidally on the bundle of conductors.

Figure 35:
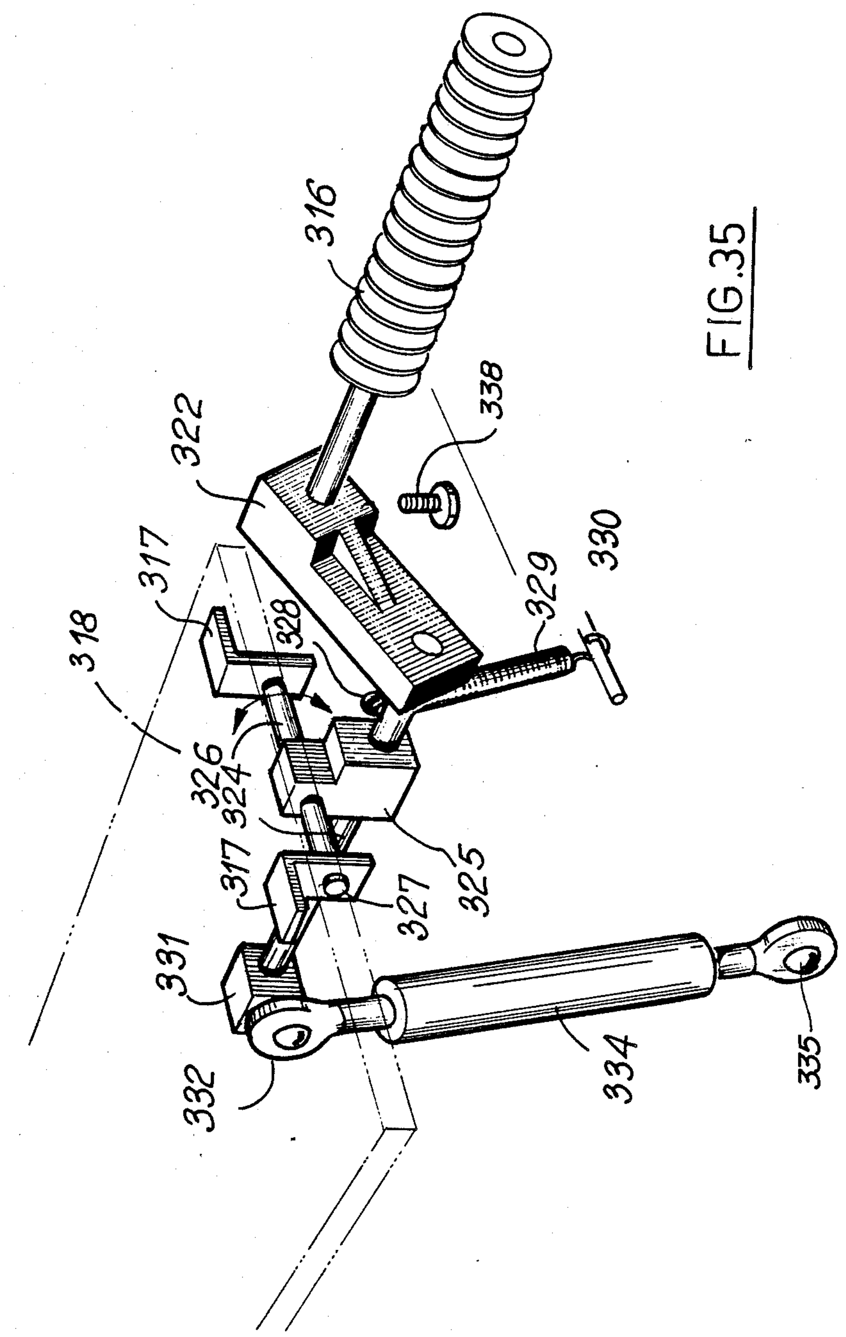
FIG. 35 illustrates a perspective view of a wire guiding device interposed between the comb and the tape winding machine of the present invention.

As illustrated in FIGS. 3 and 35, between tape winding machine 60 and comb 44 a wire guide 316 is positioned and supported by two lugs 317 integral with a table 318 supporting a hydraulic assembly 319 including a pump 320, a tank, and a distributor contained in a case 321.

Wire guide 316 is also supported by an arm 322 integral with a shaft 324. Shaft 324, in turn, is supported by a block or sleeve 325 which is integral with a shaft 326 journalled in holes 327 of lugs 317.

A finger 328 is keyed to shaft 324. One of the ends of a drawspring 329 is attached to finger 328. The other end of drawspring 329 is affixed to a lug 330 integral with table 318. The spring biases arm 322 against a stop 338.

A small bar 331 is mounted on shaft 324. A swivel 332 is journalled on one free end of bar 331. Swivel 332 pivotally connects bar 331 to the free end of the bar of a spring jack 334. The body of jack 334 is journalled on another swivel on a shaft 335 of the table.

Due to this arrangement wire guide 316 can be moved out of the way when necessary, as will now be explained. At an initial stage arm 322 is caused to pivot against the bias of spring 329, thereby pivoting shaft 326, and bar 331 is offset by an angle of over 90° so that spring jack 334 tends to maintain sleeve 325 abutting against the edge of table 318. As a result, wire guide 316 and elements 317–334 act as a toggle adapted to displace guide 316 between an operating position and a retracted position in which guide 316 engages and disengages from the main conductors 10, respectively. In addition, elements 317–334 bias guide 316 against displacement out of its retracted and operating positions.

Frame 72 discussed above in connection with FIGS. 3 and 11 includes a bracket 336 (illustrated in FIG. 3) which supports a calculating machine such as a computer 337, provided with a screen 339 and a keyboard 340.

The entire machine is subordinate to and controlled by computer 337, which include a program for directing the manufacturing of the bundle to be constructed, as set forth below.

Operation of the Apparatus of the Preferred Embodiment

In order for the preferred embodiment of the machine of the present invention to construct a bundle of conductors such as shown in FIG. 2, it will operate as follows:

The operator starts with a bundle such as that shown in FIG. 2, this bundle being naturally formed by five main conductors 10 with box elements 7 and 8. The five main conductors are each placed manually between a pair of adjacent teeth 45 of comb 44, passing over roller 46. Each conductor engages a corresponding brake 47, in order to come to rest in slot 71. The conductors 10 then pass onto wire guide 316, the box element 8, for example, being attached to a claw 284 positioned on chain 272 of tape winding station 60.

In racks, for example, positioned near the machine, the operator has at his disposal secondary conductors such as conductors 14 and 15 fitted with their box elements 11 and 12 and partly laid bare in the vicinity of or adjacent to their free ends. The operator places the secondary conductors in a certain order in channels 32 of loading station 20. See, e.g., FIGS. 3–7. Each secondary conductor comes to rest against a pallet 23, which rests on finger 26 of micro contact 25, thereby closing the circuit controlling corresponding jack 35. As a result, the rod of jack 36 descends, drives, and displaces little plate 33. This, in turn, displaces tubular elements 39 which are attached to plate 33. Elements 39 engage ramps 42, causing stirrups 28 to tilt on shafts 29 against the bias of springs 31. This movement of tubular elements 39 causes the simultaneous closure of the tongs 38 which maintain the secondary conductors 14 and 15 in their waiting position (as illustrated in FIGS. 4, 5, 6, and 7).

The operator then presses the corresponding key on keyboard 340 (FIG. 3) by which the complete cycle of the grafting of the secondary conductors on the main conductors is controlled.

Mounting station 40, on carriage 74, is next displaced by motor 80 over rails 73 and comes to rest underneath loading station 20 in such a way that tongs 85 can grip the selected secondary conductor 14 from tongs 38. See, e.g., FIGS. 3 and 11. Jack 116 and jack 105 are actuated in such a way as to displace tongs 85 Which come to rest against the secondary conductor 14 to be grafted, after which jack 106 is supplied with current in order to displace tube 102 in relation to rods 101, so that tongs 85 can close, thus gripping the secondary conductor 14. See also, e.g., FIGS. 12, 12A, 13, and 13A. The corresponding jack 35 of loading station 20 is then fed with current in such a way that piston rod 36 returns to its initial position (in the direction opposite to that shown by the arrow f in FIG. 5) and so that the secondary conductor 14 is released from tongs 38 of loading station 20. When the secondary conductor 14 is released from tongs 38, tongs 85, which are kept closed, are moved downwardly by jacks 105 and 106, so that the secondary conductor 14 will come to rest between mounting tool 125 and anvil 129, tongs 85 remaining closed. Carriage 74 is then displaced away from loading station 20 so that clamps 84 will come to rest on a level with a main conductor 10 onto which the secondary conductor 14 held by the tongs 85 is to be grafted.

While the secondary conductors 14 are being displaced into their grafting position, the bundle of main conductors 10 has been displaced accordingly so that the main and secondary conductors can be grafted. This displacement of the bundle of main conductors is controlled by chain 272 of tape winding machine 60, motor 282 having been supplied with current on the basis of the instructions programmed into computer 337. See, e.g., FIG. 30.

Stripping station 30 is then actuated so that a main conductor 10 will be partly laid bare. Jack 156 is actuated in order to lower station 30 along rails 145 to convey jaws 175 and knives 182 to the level of the main conductor 10. See, e.g., FIGS. 3, 18, and 22. Jack 161 is then also actuated, thereby causing the rod of piston 162 to descend so that cam 172 will engage rollers 171 in such a way that the main conductor 10 will be enclosed between the jaws 175 and its sheath cut by the knives 182, since branches 180 and 181 are directly connected to branches 163 and 164 by bars 184 and 185. The rod of piston 162 continues to descend so that its cam 191 comes to rest against roller 190 in order to tilt plate 174 on its shaft 173 against the bias of spring 192, and thus displaces branches 180 and 181 as a whole, so that knives 182 drive the sheath from the location where it has been cut. In addition, the rod of piston 162 continues to descend, rollers 171 escape cam 172, and the bias of springs 187 causes securing clamp 165 and stripping clamp 179 to open suddenly, thus releasing the main conductor 10, of which a portion has been laid bare (as illustrated in FIGS. 18, 19, 20 and 21).

Station 30 is then displaced upwardly along rails 145 (FIG. 18) while rod 162 resumes its initial position, thereby retracting rollers 171 by the pivoting of levers 141 against the bias of springs 168. Levers 141 come to rest against the stops 126.

Clamps 84 are displaced upwardly (see FIG. 12) in order to grip the main conductor 10, of which a portion has been stripped. Jack 96 is supplied with current in order to displace the entire set of clamps 84 which are kept open and which move jaws 89 into position around the main conductor 10 of which one portion has been stripped. Jack 94 is actuated in order to close jaws 89 on the main conductor 10, after which jack 96 is actuated in order to move the main conductor 10 into the vicinity of the secondary conductor 14 held in position by clamps 84 of mounting station 40.

The main conductor 10 and the secondary conductor 14 are held in position side-by-side by clamps 84 and tongs 85, respectively. These conductors have their stripped portions at a level with the thimble 120 positioned in front of tool 125 (as seen in FIGS. 15, 16 and 17). Tool 125 is displaced by rod 127 of jack 128 so that thimble 120 is cut by knife 143 and guided by lever 138. As tool 125 continues to advance, lever 138 is lowered and engages slit 144, while thimble 120 is tightly mounted on the conductors by being thrust by the tool against anvil 129. Rod 127 of jack 128 is then returned to its initial position, while jack 132 is supplied with current in such a way that catch 130 displaces the strip of thimbles by a distance corresponding to one thimble 120, in order to move a new thimble into position in front of tool 125. Jack 132 is then actuated so that catch 130 will resume its initial position.

Jack 106 is now supplied with current in order to cause tubes 102 to slide in the direction corresponding to the opening of the tongs, thereby opening tongs 85, while second carriage 146 is displaced in such a way that its cavity 267 is positioned opposite the splice formed by thimble 120 tightly mounted on the main conductor 10 and the secondary conductor 14. Jack 96 (illustrated in FIG. 12) is supplied with current in such a say that the main conductor 10 is gripped by clamps 84 so that the main conductor 10 with its splice will be conveyed into cavity 267.

Figure 25:
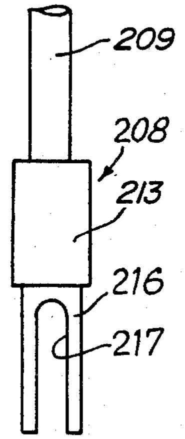
FIG. 25 illustrates a schematic cross-sectional view showing the slide of the device for advancing the strip of the present invention.

At insulating station 50 (as seen in FIGS. 3 and 22) compressed air is conveyed into cartridge 261 through tube 263 so that a drop of pasty product 268 of the cartridge will be deposited on strip of material 196 at a level with opening 217 of blade 216 as shown in FIG. 25.

Jack 209 is then actuated in such a way that the slide 213 moves downwardly, entraining strip of material 196, so that the part of strip of material 196 which has received the drop of pasty product 268 comes to rest in cavity 267 on a level with the splice (as shown in FIGS. 26 and 27). Jack 250 is then actuated in such a way that push rod 249 comes to rest against material 196, which is thus thrust against the splice, jack 256 being actuated at the same time in such a way that cam 254 on rod 255, engaging the roller 252, tilts lever 240 about its shaft 241, in such a manner that die 223 is displaced towards punch 222. Knife 247 then passes under knife 225 in order to cut a portion of strip of material 196 while at the same time the piece thus cut is folded in the shape of a reversed U with flanges, so that the free ends of the flanges of material 196 come to rest in the punch (as seen in FIG. 28). Jack 232 is then actuated and the free ends of the flanges of material 196 are tightly mounted on the splice as seen in FIG. 29. Jacks 250, 256, 232, and 209 are then actuated in order to return to their initial positions, while clamps 84 are opened by jack 94, in order to release the main conductor 10, and are returned to a retracted position by jack 96.

Motor 282, which causes chain 272 to advance (as seen in FIG. 30), is actuated in order to move the bundle of main conductors 10 over a distance corresponding to the grafting of the second secondary conductor 14, and the same cycle as that just described is repeated in order to produce a further splicing on a second main conductor 10.

When all the graftings have been completed tape winding machine 60 is actuated and head 290 winds tape 294 around the bundle.

Figure 36:
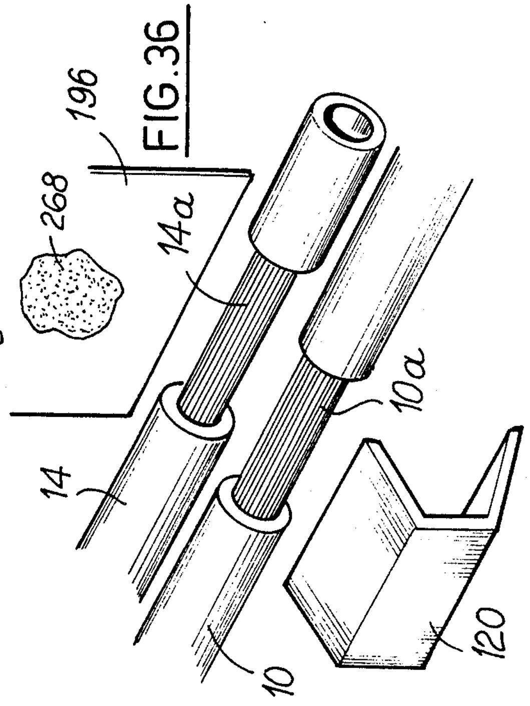
FIG. 36 illustrates an exploded view, in perspective, on a larger scale, of the splice forming operation of the present invention.
Figure 37:
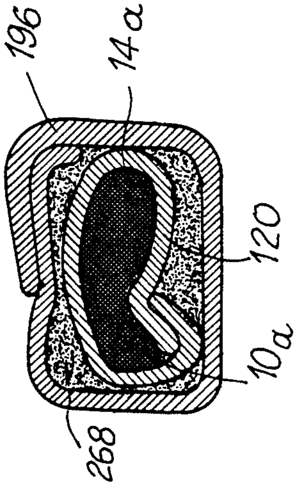
FIG. 37 illustrates a cross-sectional view of the splice of the present invention.

FIGS. 36 and 37 show a splice obtained between a main conductor 10 (which has a stripped portion **10*a* produced at stripping station 30) and a secondary conductor 14 (of which the free end is partly stripped at the point marked 14*a*). Thimble 120 is tightly mounted on the conductors, as shown in FIG. 37, so that the strands forming the conductor core of the two conductors will be intimately bound together. A portion of material 196 is tightly mounted on thimble 120 in such a way as to enclose thimble 120 completely, while a drop of pasty material 268 is deposited on the internal surface of material 196, at the moment when material 196 is tightly mounted over thimble 120. Pasty material 268** will flow through the sheaths in order to complete the insulation.

It will be noted that the machine comprises a large number of safety devices. For example, if the bundle of main conductors is tangled, comb 44 (as seen in FIGS. 3 and 10) will tilt on its shaft 51 against the bias of spring 52 so that switch 55 will cut off the supply of power to the machine, and this anomaly is displayed on screen 339.

In addition, brakes 47 (as seen if FIGS. 8–10) enable the tension of the main conductors to be kept substantially uniform in the course of their various manipulations, i.e., stripping, tight mounting, insulation.

Referring to the embodiment shown in FIGS. 2 and 3, the variables that can be controlled by the program fed into computer 337 are listed below in the following table. This table lists the various operations that can be programmed into the computer. Each line represents the precise operations the machine will perform during one grafting operation. The first nine operations listed horizontally (i.e. Pas - Fil) represent the values of certain variables that the invention exhibits, such as the pitch of the tape winding machine (pas) or the force exerted in the tight mounting operation (eff). The exact value of these variables can be programmed into computer 337 by the operator. The next 13 operations which are listed horizontally in abbreviated form after "Fil", and some of which are listed vertically on the left most part of the table represent certain conditions certain elements of the invention may exhibit. For example, when the instruction MT is programmed into computer 337 by the operator, head 290 of the tape winding machine is placed into operation, whereas when AT is programmed into computer 37, head 290 stops. The table is reproduced below.

The first nine abbreviations listed horizontally across the top of the table specify those operations performed by the machine having parameters associated therewith that must be specified by the operator. For example, operation DIST specifies the position along the main conductor, in millimeters, at which the main conductor 10 is stopped for grafting of a secondary conductor 14 thereon. The meanings of the respective abbreviations are as follows:

PAS : The pitch of the tape winding machine in mm.

EFF : The force, in tons, exerted in the tight mounting operation.

POMP : The pumping value in mm.

DIST: The position, in mm, from one end of the main conductor at which the main conductor (after being displaced through the machine) is to be stopped in that part of the machine at which the main conductor is to be grafted onto one or more secondary conductors. It is at this position from the end of the main conductor that the grafting takes place.

NBR : The number of graftings that will take place on the main conductor at the position at which the main conductor is stopped as specified by the DIST command.

PRS : Number of the "dispenser" from which a secondary conductor is to be taken.

CHG : The number of the inlet of the loading station into which a secondary conductor is to be inserted and from which it is to be taken in order to be grafted.

COUL : Possible color of the secondary conductor.

FIL : The number of the main conductor to be provided with a secondary conductor.

Referring to FIG. 2 and the table above, it can be seen that the first grafting a (represented by the first horizontal line of numbers in the table) involves the grafting of only one secondary conductor on main conductor $10_1$ and will be carried out at 590 mm measured from box element 8 on main conductor $10_1$, the grafted secondary conductor 14 having been taken from "dispenser" 1 and placed in loading station A. The second grafting b (represented by the second horizontal line of numbers in the table) is carried out at 640 mm from the box element on main conductor $10_2$. The machine then stops at 900 mm in order to enable conductors 14 and box element 11 to be released from the tape winding head (represented by the third horizontal line of numbers in the table). The third grafting c (represented by the fourth horizontal line of numbers in the table) is carried out at 2590 mm from the box element on main conductor 10$_5$.

The next two graftings e and e (represented by the fifth and sixth horizontal lines of numbers in the table) are carried at 2640 mm and 2690 mm, from the box element, respectively, on main conductor $10_3$ and $10_4$. The machine then stops at 2900 mm so that box element 12 can be released (represented by the seventh horizontal line of numbers in the table) and then at 3850 mm (represented by the eighth horizontal line of numbers in the table), where box element 7 is released from comb 44 and brakes 61.

In addition, the abbreviations listed vertically down the left side of the table, which are also listed horizontally across the top of the table to the right of FIL represent functions which the apparatus of present invention can perform if so instructed. These functions are either performed or not performed, depending upon whether they are programmed into the computer. The abbreviations represent the following manipulations:

TX : When this command is given a computer screen displays the meaning of the various abbreviations in table.

QS : "Outlet tail" : The main bundle comprises a secondary bundle (11–14) which is not wound with tape together With the main bundle when this command is given.

OB : "Boeing opening": Presser roller 315 (see FIG. 30) is lifted to prevent conductors 14 from being wound with tape when this command is given.

MT : Operation of the head : Head 290 of the tape winding machine is in operation when this command is given.

AT : Head stationary : Head 290 is stopped when this command is given.

RA : "Reinforcement of stop": Head 290 is operated for a certain period although the main bundle has not been moved, in order to effect a "reinforcement of tape 294" on the bundle when this command is given.

RD : "Reinforcement of starting": Head 290 is operated as soon as the main bundle has been placed on the plate 286, in order to provide an extra thickness of tape 294 when this command is given.

GV : High Speed: Motor 282 turns at a high speed in order ;to discharge the finished bundle at the end of the tape winding machine when this command is given.

PV : Low Speed: Motor 282 is driven at the normal speed when this command is given.

AV : Warning device: sound signal is produced in order to draw he attention to the operator to a particular operation to be carried out at a certain moment when this command is given.

FF : End of bundle.

Each of these operations can be programmed into computer 337.

For example, at 900 mm for instance, it is necessary to release conductors 14 and box element 11, which are not to be wound with tape. In order for this function to be performed instruction OB is programmed into computer 337 to release conductors 14 and box 11 at 900 mm. Similarly, at 2900 mm it is necessary to release conductors 15 and box element 12, which are not to be wound with tape at his point. In order for this function to be performed instruction OB is programmed into computer 337.

The operator can at any moment verify the performance of the operations, which are displayed on the screen 339 in order to facilitate the work.

Although the invention has been described with respect to particular means, methods, and embodiments, the invention is not limited to the embodiments described above and illustrated in the diagrams, and numerous modifications can be made thereto in matters of detail without departing from the scope of the invention which extends to all equivalents within the scope of the claims.

What is claimed is:

1. A method for manufacturing bundles of electrical cabling systems, wherein said systems comprise a plurality of main conductors and a plurality of secondary conductors, wherein said main conductors comprise a conductor core, an insulating sheath having a plurality of ends, and connection elements connected to said plurality of ends, wherein said connection elements comprise box elements comprising either male plugs or female sockets adapted to engage complementary elements, wherein said secondary conductors comprise a conductor core and an insulating sheath, wherein said core of each of said plurality of main conductors and said plurality of secondary conductors is mounted in said sheath, wherein said method comprises the steps of:

(a) stripping an intermediate portion of at least one main conductor;
(b) stripping at least one secondary conductor in the general vicinity of at least one of the ends of said at least one secondary conductor;
(c) positioning said stripped portions of said main and secondary conductors against one another tightly;
(d) mounting a thimble on said two stripped portions; and
(e) mounting a band of cold-deformable insulating material on said thimble.

2. The method defined by claim 1 wherein said method further comprises the steps of performing steps (a)–(e) a plurality of times for a plurality of main and secondary condcutors.

3. The method defined by claim 1 further comprising the step of inserting a pasty insulating material between said thimble and said band of insulating material.

4. The method defined by claim 3 wherein said pasty material is a silicone material.

5. An electrical cabling system manufactured by the method comprising the steps of:

(a) stripping an intermediate portion of at least one main conductor;
(b) stripping at least one secondary conductor in the general vicinity of at least one of the ends of said at least one secondary conductor corresponding to said at least one main conductor;
(c) positioning the stripped portions of said main and secondary conductors against one another tightly;
(d) mounting a thimble on said two stripped portions; and
(e) mounting a band of cold-deformable insulating material on said thimble.

6. The system defined by claim 5 wherein said system comprises:

(a) said at least one main conductor having a plurality of ends and comprising:
  (i) a conductor core;
  (ii) an insulating sheath,
    wherein said conductor core is mounted in said insulating sheath;
  (iii) connection elements connected to said plurality of ends, wherein said connection elements comprise box elements comprising either male plugs or female sockets adapted to engage complementary elements; and
(b) said at least one secondary conductor comprising:
  (i) a conductor core; and
  (ii) an insulating sheath, wherein said conductor core of said secondary conductor is mounted in said insulating sheath of said secondary conductor.

7. The system defined by claim 6 wherein said at least one main conductor and said at least one secondary conductor comprise, respectively, a plurality of main and secondary conductors, wherein said method is performed a plurality of times.

8. An apparatus for manufacturing bundles of electrical cabling systems, wherein said cabling systems comprise at least one main conductor having a plurality of ends and at least one secondary conductor having a plurality of ends, wherein said main conductor comprises a conductor core, an insulating sheath surrounding each of said at least one main conductor and an insulating sheath surrounding each of said at least one secondary conductor except for a portion in the general vicinity of at least one of the ends of said secondary conductor thereby creating a stripped portion of said secondary conductor, and connection elements connected to said plurality of ends, wherein said connection elements comprise box elements comprising either male plugs or female sockets adapted to engage complementary elements, wherein said at least one secondary conductor comprises a conductor core and an insulating sheath, wherein said conductor core is mounted in said insulating sheath, wherein said apparatus comprises:

(a) means for stripping said insulating sheath from an intermediate portion of at least one main conductor;

(b) means for positioning the stripped portions of said at least one main conductor and said at least one secondary conductor tightly against one another to produce a splice, said means for positioning being operatively associated in said apparatus with said means for stripping for operation subsequent thereto;

(c) means for mounting a thimble on said two stripped portions at said splice, said means for mounting a thimble being operatively associated in said apparatus with said means for positioning for operation subsequent thereto; and (d) means for mounting a band of cold-deformable insulating material on said thimble, said means for mounting a band being operatively associated in said apparatus with said means for mounting a thimble for operation subsequent thereto.

9. The apparatus defined by claim 8 wherein said at least one main conductor and said at least one secondary conductor comprise, respectively, a plurality of pairs of main and secondary conductors, wherein said plurality of main conductors comprises a bundle, wherein said stripping means (a) comprises means for stripping each main conductor of said pair, wherein said positioning means (b) comprises means for positioning said stripped portions of one member of each pair of said main conductor and said secondary conductor tightly against the other member of each pair of said main conductor and said secondary conductor, wherein said mounting means (c) comprises means for mounting a thimble on said stripped portions of each pair of said plurality of pairs of main and secondary conductors, and wherein said mounting means (d) comprises means for mounting a band of cold-deformable insulating material on each said thimble.

10. The apparatus defined by claim 9 further comprising:

a frame;

a loading station for receiving said stripped secondary conductors, wherein said station is supported by said frame;

means for holding said bundle of main conductors for subsequent operations of said apparatus;

means for driving said bundle of main conductors through said apparatus as operations are performed by said apparatus with respect to said bundle of main conductors;

means for guiding said bundle of main conductors through said apparatus to maintain said bundle of main conductors properly positioned as they are driven through said apparatus;

means for stopping the driving of said bundle of main conductors with respect to said apparatus;

means for displacing said bundle of main conductors into a predetermined position for subsequent operation with respect thereto;

means operatively associated with said loading station for extracting said secondary conductors from said loading station;

means for positioning and maintaining at least one pair of main and secondary conductors side-by-side after said secondary conductors have been extracted from said loading station by said means for extracting and after stripping of said main conductor by said stripping means;

means for firmly securing together the two stripped portions of said main conductor and said secondary conductor, wherein said securing means comprises a thimble; and means for enclosing said thimble in insulation after said thimble secures said two stripped portions.

11. The apparatus defined by claim 10 wherein said loading station comprises:

a box comprising at least one pair of stirrups, wherein each stirrup comprises a web, wherein each web comprises a groove, wherein two corresponding grooves of said webs together comprise a substantially rectilinear throat adapted to accommodate a respective one of said at least one secondary conductor, wherein each said throat comprises a base, wherein each said stirrup is pivotally mounted on said apparatus;

a restoring spring associated with each of said pair of stirrups for biasing said stirrups against said pivoting;

a contact positioned in said base of each said throat;

a control circuit, wherein said circuit closes in response to displacement of said contact;

at least one jack associated with said box and actuated by said closing of said control circuit, wherein each said jack comprises a piston rod adapted to be displaced relative to said box from a retracted position into an extended position as said jack is actuated;

at least one tubular element operatively associated with respective ones of said piston rod to move therewith and adapted to engage said webs of said stirrups as said piston rod is displaced toward said extended position to deflect said stirrups to form a slit in said substantially rectilinear throat of a size sufficient to accommodate said respective secondary conductor; and at least one pair of elastic metal rods affixed to said box and which extend through respective ones of each said tubular element, wherein said elastic metal rods each comprise a bent free end, wherein each pair of bent free ends of said elastic metal rods form a tong adapted to grip said respective secondary conductor, wherein each tong grips said respective secondary conductor before deflection of said stirrups, thereby guiding said respective secondary conductor through said slit formed in said throat in response to displacement of said piston rod into said extended position.

12. The apparatus defined by claim 11 wherein said at least one pair of stirrups comprise a plurality of pairs of stirrups, wherein said extended position of said piston rod is lower than said retracted position of said piston rod so that teach said tong grips said respective secondary conductor before deflection of said stirrups, thereby guiding said respective secondary conductor through said slit formed in said throat in response to descent of said piston rod into said extended position.

13. The apparatus defined by claim 10 wherein said driving means comprises a tape winding machine for winding tape around said bundle of main conductors, wherein said tape winding machine comprises:

an endless chain comprising means for attachment to said bundle of main conductors; and a motor for driving said endless chain.

14. The apparatus defined by claim 10 wherein said guiding means comprises:

a plurality of brakes adapted to engage said main conductors, wherein said plurality of brakes are pivotally mounted on said frame, wherein each said brake comprises two limbs; and a plurality of springs for biasing said plurality of brakes against said pivoting, wherein said plurality of brakes and said plurality of springs comprise means for elastically gripping said main conductors between said two limbs.

15. The apparatus defined by claim 10 wherein said driving means comprises a tape winding machine for winding tape around said bundle of main conductors, wherein said guiding means further comprises a wire guiding device retractably mounted on said apparatus and positioned upstream from said tape winding machine.

16. The apparatus defined by claim 15 wherein said guiding means further comprises:

a shaft mounted on said frame;

a sleeve supported by said shaft, wherein said wire guide is attached to said sleeve so that said wire guide is adapted to pivot between an operating position and a retracted position, wherein in said operating position said wire guide engages said main conductors, wherein in said retracted position said wire guide is disengaged from said main conductors; and a toggle biasing said wire guide against displacement out of said operating and retracted positions.

17. The apparatus defined by claim 10 wherein a plurality of said means of said apparatus operate in response to receiving current, wherein said guiding means comprises:

an element pivotally mounted on said apparatus;

a spring biasing said element against pivoting;

a comb for guiding said bundle of main conductors, wherein said comb is supported by said element; and a circuit comprising a contact, wherein said element is adapted to bear against said contact, wherein said circuit comprises means for interrupting said current to said apparatus in response to pivoting of said element against the bias of said spring beyond a predetermined extent.

18. The apparatus defined by claim 17 wherein said guiding means further comprises:

a plurality of brakes adapted to engage said main conductors, wherein said plurality of brakes are pivotally mounted on said frame, wherein each brake comprises two limbs; and a plurality of springs for biasing said plurality of brakes against said pivoting, wherein said plurality of brakes and springs comprise means for elastically gripping said main conductors between said two limbs.

19. The apparatus defined by claim 18 wherein said driving means comprises a tape winding machine for winding tape around said bundle of main conductors, wherein said guiding means further comprises a wire guide retractably mounted on said apparatus and positioned upstream from said tape winding machine.

20. The apparatus defined by claim 19 wherein said guiding means further comprises:

a shaft mounted on said frame;

a sleeve supported by said shaft, wherein said wire guide is attached to said sleeve so that said wire guide is adapted to pivot between an operating position and a retracted position, wherein in said operating position said wire guide engages said main conductors, wherein in said retracted position said wire guide is disengaged from said main conductors; and a toggle biasing said wire guide against displacement out of said operating and retracted positions.

21. The apparatus defined by claim 10 wherein said main conductor stripping means comprises:

a securing clamp positioned in said apparatus to permit enclosing and clamping said main conductors to be stripped, wherein said securing clamp is adapted to be opened and closed;

means connected to said securing clamp for displacing said clamp into said closed position in which said clamp clamps said main conductors;

a stripping clamp positioned for operative association with said securing clamp for stripping said main conductors, wherein said stripping clamp comprises two knives for cutting said sheath of said main conductors, wherein said stripping clamp and said two knives are adapted to be displaced into a closed position in which said knives contact said sheath of said main conductors and into a retracted open position in which said knives are spaced from said sheath; and means connected to said stripping clamp for displacing said stripping clamp and said securing clamp into said opened positions.

22. The apparatus defined by claim 21 wherein said securing clamp and said stripping clamp each comprises first and second limbs, wherein said main conductor stripping means further comprises first, second, third, and fourth substantially parallel shafts, wherein said first limbs of said securing clamp and said stripping clamp are journalled, respectively, on said first and third shafts around first and third pivot axes, wherein said second limbs of said securing clamp and said stripping clamp are journalled, respectively, on said second and fourth shafts around second and fourth pivot axes, wherein said first and third pivot axes and shafts are coaxial, wherein said second and fourth shafts and pivot axes are coaxial, wherein said first limbs of said stripping clamp and said securing clamp are connected to each other and said second limbs of said stripping clamp and said securing clamp are connected to each other such that said opening and closing of said stripping clamp and said securing clamp are synchronized and interdependent.

23. The apparatus defined by claim 22 wherein said main conductor stripping means further comprises:

a shaft attached to said apparatus and extending substantially orthogonal to said pivot axes of said clamp limbs; and a plate pivotally mounted on said shaft, wherein said stripping clamp is supported by said plate.

24. The apparatus defined by claim 23 wherein said securing clamp further comprises means for biasing said securing clamp into said open position and a plurality of rollers, one roller positioned on each limb of said securing clamp, wherein said means for displacing said securing clamp into said closed position comprises:

a jack comprising a piston adapted to be displaced from a retracted position to a first intermediate position, a second intermediate position, and then to an extended position; and a first cam operatively associated with said piston comprising an inclined portion adapted to engage said rollers, wherein said first cam further comprises means for pivoting said securing clamp limbs into said closed position by means of contact between said inclined portion and said rollers in response to displacement of said piston to said first intermediate position, wherein said first cam further comprises means for displacing said inclined portion below said rollers so that said first cam is spaced from said rollers in response to displacement of said piston from said first intermediate position to said extended position, wherein said biasing means comprises said means for displacing said securing clamp into said open position in response to spacing of said first cam from said rollers.

25. The apparatus defined by claim 24 wherein said plate further has attached thereto a roller, wherein said piston rod is operatively associated with a second cam extending orthogonally to said first cam and adapted to engage said roller of said plate.

26. The apparatus defined by claim 25 wherein said jack comprises means for pressing said second cam against said roller of said plate in response to displacement of said piston into said second intermediate position, wherein said roller of said plate comprises means for pivoting said plate, wherein said plate comprises means for squeezing said knives into said sheath of said main conductors in response to pivoting of said plate by said roller.

27. The apparatus defined by claim 10 wherein said frame further comprises a plurality of substantially horizontally extending rails, wherein said apparatus further comprises:

a first carriage mounted to slide on said plurality of rails;

means for displacing said first carriage on said plurality of rails; and substantially vertically displaceable clamps supported on said first carriage for gripping one of said main conductors onto which a secondary conductor of said at least one secondary conductor is to be grafted, wherein said extracting means comprises substantially vertically displaceable tongs supported on said first carriage for extracting respective ones of said secondary conductors from said loading station, wherein said positioning and maintaining means comprises said clamps and said tongs.

28. The apparatus defined by claim 27 wherein said firmly securing means is supported on said first carriage and further comprises:

a strip of thimbles;

means supported by said first carriage for advancing said strip of thimbles through said apparatus; and means additionally supported by said first carriage for separating one of said thimbles from said strip and for tightly mounting said one of said thimbles on said conductors.

29. The apparatus defined by claim 28 wherein said separating means comprises an anvil against which one of said thimbles is pressed by said means for advancing to separate said one of said thimbles from said strip.

30. The apparatus defined by claim 29 wherein said first carriage further comprises a slit, wherein said separating means further comprises:

a tool comprising:

a displaceable lever; and a shaft attached to said first carriage, wherein said lever is journalled on said shaft;

a jack supported by said first carriage comprising a piston rod for displacing said tool; and said slit, wherein said slit is adapted to accommodate said lever therein, wherein said piston rod comprises means for displacing said lever into said slit and for pressing said lever laterally against said one of said thimbles to exert lateral pressure against said one of said thimbles.

31. The apparatus defined by claim 30 wherein said advancing means comprises:

a catch for engaging said strip of thimbles; and a jack supported on said first carriage comprising a piston rod for displacing said catch step-by-step, thereby displacing said strip of thimbles step-by-step.

32. The apparatus defined by claim 31 wherein said catch is attached to said rod of said jack of said advancing means, wherein said strip of thimbles comprises two flanges having two edges, wherein said advancing means further comprises:

a slideway in which said strip advances;

a slide integral with said rod of said jack of said advancing means;

a spring on said slide;

a shaft on said slide, wherein said shaft pivotally mounts said catch on said slide, wherein said spring biases said catch, wherein said advancing means comprises:

means for engaging said catch with said two edges of said strip and for displacing said strip in said slideway in response to forward displacement of said rod of said jack of said advancing means; and means for displacing said catch in a rearward direction and for disengaging said catch from said strip in response to rearward displacement of said rod of said jack of said advancing means, wherein said slideway has an end, wherein said tool is positioned adjacent said end of said slideway.

33. The apparatus defined by claim 27 further comprising:

a second carriage displaceable substantially horizontally on said frame; and means operatively associated with said frame for displacing said second carriage substantially horizontally on said frame;

wherein said second carriage supports said main conductor stripping means, wherein said main conductor stripping means is mounted to slide substantially vertically on said second carriage, and wherein said apparatus further comprises a jack supported by said second carriage for substantially vertically displacing said main conductor stripping means.

34. The apparatus defined by claim 33 wherein said second carriage comprises a cavity adapted to receive said splice, wherein said apparatus further comprises:

a reel supported by said second carriage;

a strip of cold-deformable insulating material on said reel;

means supported by said second carriage for advancing said strip of cold-deformable insulating material from said reel a distance corresponding to the length of insulation desired;

means supported by said second carriage for cutting off a piece of said cold-deformable insulating material from said strip of cold-deformable insulating material; and means supported by said second carriage for tightly mounting said cut off piece of cold-deformable insulating material on said splice.

35. The apparatus defined by claim 34 wherein said apparatus further comprises:

a jack supported by said second carriage comprising a piston;

a slide for driving said strip of cold-deformable insulating material, wherein said slide is supported by said piston; and a non-return brake supported by said second carriage, wherein said strip of cold-deformable insulating material extends through said non-return brake, wherein said brake comprises means for permitting displacement of strip of cold-deformable insulating material in a first direction and for preventing displacement of said strip of cold-deformable insulating material in a second direction opposite from said first direction.

36. The apparatus defined by claim 35 wherein said slide comprises an aperture therein, wherein said apparatus further comprises:

a cartridge supported by said second carriage;

a pasty insulating product inside said cartridge;

a distribution tube connected to said cartridge terminating at said strip of cold-deformable insulating material opposite from said aperture; and means operatively associated with said cartridge for conveying a drop of said pasty insulating product from said distribution tube to said strip of cold-deformable insulating material.

37. The apparatus defined by claim 36 wherein said means for conveying further comprises:

a source of compressed air operatively associated with said cartridge;

a tube connecting said source to said cartridge; and a timing device for controlling the length of time said compressed air is conveyed through said connecting tube to said cartridge, wherein said pasty insulating product is subjected to a predetermined quantity of compressed air for a predetermined period of time so as to convey a predetermined amount of said pasty insulating product through said distribution 38. The apparatus defined by claim 35 wherein said apparatus further comprises:

a guide blade supported by said second carriage for guiding said strip of cold-deformable insulating material into said cavity, wherein said guide blade is supported by said slide.

39. The apparatus defined by claim 38 wherein said apparatus further comprises:

a fixed knife positioned above said cavity;

a passageway having a first portion extending in a direction from said cavity toward said loading station and said main conductor stripping means; and a displaceable knife positioned in said first portion of said passageway and adapted to be displaced in said first portion of said passageway toward said cavity to engage said fixed knife to cut said cold-deformable insulating material.

40. The apparatus defined by claim 39 wherein said passageway further comprises a second portion extending from said cavity in a direction opposite from said direction in which said first portion extends, wherein said apparatus further comprises:

a die positioned in said first portion of said passageway;

a punch positioned in said second portion of said passageway;

a jack supported by said second carriage for displacing said punch in said second portion of said passageway; and a jack supported by said second carriage for displacing said die in said first portion of said passageway against said punch.

41. The apparatus defined by claim 40 wherein said die has connected thereto a push rod, wherein said jack for displacing said die is adapted to displace said push rod axially in said passageway.

42. The apparatus defined by claim 41 wherein said jack for displacing said die is adapted to displace said push rod axially in said passageway to hold said strip of cold-deformable material against said splice positioned in said cavity.

43. The apparatus defined by claim 34 wherein said apparatus further comprises:

a cartridge supported by said second carriage;

a pasty insulating product inside said cartridge;

a distribution tube connected to said cartridge terminating at said strip of cold-deformable insulating material;

means operatively associated with said cartridge for conveying a drop of said pasty insulating product from said distribution tube to said strip of cold-deformable insulating material.

44. The apparatus defined by claim 43 further comprising:

a source of compressed air operatively associated with said cartridge;

a tube connecting said source to said cartridge; and a timing device for controlling the length of time said compressed air is conveyed through said connecting tube to said cartridge, wherein said pasty insulating product is subjected to a predetermined quantity of compressed air for a predetermined period of time so as to convey a predetermined amount of said pasty insulating product through said distribution tube.

45. The apparatus defined by claim 10 further comprising:

a carriage displaceable substantially horizontally on said frame;

means operatively associated with said carriage for displacing said carriage substantially horizontally on said frame;

wherein said carriage supports said main conductor stripping means, wherein said main conductor stripping means is mounted to slide substantially vertically on said carriage, and wherein said apparatus further comprises a jack supported by said carriage for substantially vertically displacing said main conductor stripping means.

46. The apparatus defined by claim 45 wherein said carriage comprises a cavity adapted to receive said splice, wherein said apparatus further comprises:

a reel supported by said carriage;

a strip of cold-deformable insulating material on said reel;

means supported by said carriage for advancing said strip of cold-deformable insulating material a distance corresponding to the length of insulation desired;

means supported by said carriage for cutting off a piece of said cold-deformable insulating material from said strip of cold-deformable insulating material; and means supported by said carriage for tightly mounting said cut off piece of cold-deformable insulating material on said splice.

47. The apparatus defined by claim 46 wherein said apparatus further comprises:

a jack supported by said carriage comprising a piston;

a slide for driving said strip of cold-deformable insulating material, wherein said slide is supported by said piston; and a non-return brake supported by said carriage, wherein said strip of cold-deformable insulating material extends through said non-return brake, wherein said brake comprises means for permitting displacement of said strip of cold-deformable insulating material in a first direction and for preventing displacement of said strip of cold-deformable insulating material in a second direction opposite from said first direction.

48. The apparatus defined by claim 47 wherein said slide comprises an aperture therein, wherein said apparatus further comprises:

a cartridge supported by said carriage;

a pasty insulating product inside said cartridge;

a distribution tube connected to said carriage terminating at said strip of cold-deformable insulating material opposite from said aperture;

means operatively associated with said cartridge for conveying a drop of said pasty insulating product from said distribution tube to said strip of cold-deformable insulating material.

49. The apparatus defined by claim 48 wherein said means for conveying further comprises:

a source of compressed air operatively associated with said cartridge;

a tube connecting said source of compressed air to said cartridge; and a timing device for controlling the length of time said compressed air is conveyed through said connecting tube to said cartridge, wherein said pasty insulating product is subjected to a predetermined quantity of compressed air for a predetermined period of time so as to convey a predetermined amount of said pasty insulating product through said distribution tube.

50. The apparatus defined by claim 47 wherein said apparatus further comprises:

a guide blade supported by said carriage for guiding said strip of cold-deformable insulating material into said cavity, wherein said guide blade is supported by said slide.

51. The apparatus defined by claim 50 wherein said apparatus further comprises:

a fixed knife positioned above said cavity; and a passageway having a first portion extending in a direction from said cavity toward said loading station and said main conductor stripping means; and a displaceable knife positioned in said first portion of said passageway and adapted to be displaced in said first portion of said passageway toward said cavity to engage said fixed knife to cut said cold-deformable insulating material.

52. The apparatus defined by claim 51 wherein said passageway further comprises a second portion extending from said cavity in a direction opposite from said direction in which said first portion extends, wherein said apparatus further comprises:

a die positioned in said first portion of said passageway;

a punch positioned in said second portion of said passageway;

a jack supported by said carriage for displacing said punch in said second portion of said passageway;

a jack supported by said carriage for displacing said die in said first portion of said passageway against said punch.

53. The apparatus defined by claim 10 further comprising a tape winding machine for winding tape around said bundle of main conductors, wherein said tape winding machine comprises:

a channel for grouping said main conductors together;

a tape winding head operatively associated with said channel;

a roll of tape supported by said head;

means for rotating said head and for winding said tape onto said bundle of main conductors as said bundle of main conductors advance relative to said tape winding head;

an endless chain;

a motor for rotatably driving said endless chain;

means for connecting said motor to said endless chain for driving said endless chain;

a claw attached to said endless chain, wherein said claw comprises means for attaching a box element of said bundle of main conductors to said endless chain; and an ejector operatively associated with said claw and said endless chain for expelling said box element after said bundle is wound with said tape.

* * * * *

UNITED STATES PATENT AND TRADEMARK OFFICE
CERTIFICATE OF CORRECTION

PATENT NO. : 4,875,286

DATED : October 24, 1989

INVENTOR(S) : S. LEANDRIS et al.

It is certified that error appears in the above-identified patent and that said Letters Patent is hereby corrected as shown below:

Column 1, line 22, change "proVided" to ---provided---;
Column 4, line 3, delete "can";
Column 6, lines 57-58, change "the the" to ---the---;
Column 9, line 18, insert ---embodiments--- after "particular";
Column 9, line 30, insert ---illustrates--- after "5";
Column 9, line 33, after "stirrups" insert ---for---;
Column 9, line 46, delete "," after "the";
Column 9, line 48, after "supported" insert ---by---;
Column 9, line 49, before "invention" insert ---present---;
Column 9, line 54, after "supported" insert ---by---;
Column 10, line 2, after "stripping" insert ---assembly of---;
Column 10, line 9, change "." to ---of FIG.---;
Column 10, line 11, change "assmebly" to ---assembly---;
Column 10, line 16, change "XXVI" to ---XXIV---;
Column 10, line 16, after ";" delete ",";
Column 13, line 27, change "ar" to ---are---;
Column 14, line 5, change "FIG" to ---FIGS---;
Column 14, line 33, change ""14" to ---"14"---;
Column 18, line 34, change "FIGS" to ---FIG---;
Column 18, line 65, change "Will" to ---will---;
Column 19, line 1, change "17" to ---179---;
Column 19, line 60, change "carriage 196" to ---carriage 146---;
Column 22, line 50, change "include" to ---includes---;
Column 23, line 11, change "rod of jack 36" to ---piston rod 36 of jack 35---;
Column 23, line 29, change "Which" to ---which---;
Column 24, line 53, change "say" to ---way---;
Column 26, line 4, change "37" to ---337---;
Column 26, between lines 5 and 6, insert page 45A in its entirety;per attached
Column 26, line 39, change "a" to ---a---;
Column 26, line 46, change "b" to ---b---;
Column 26, line 52, change "c" to ---c---;
Column 26, line 56, change "e and e" to ---d and e---;

UNITED STATES PATENT AND TRADEMARK OFFICE
CERTIFICATE OF CORRECTION

PATENT NO. : 4,875,286

DATED : October 24, 1989

INVENTOR(S) : S. LEANDRIS et al.

It is certified that error appears in the above-identified patent and that said Letters Patent is hereby corrected as shown below:

Column 26, line 65 change "61" to ---47---;
Column 27, line 4, change "programmend" to ---programmed---;
Column 27, line 8, before "table" insert ---the---;
Column 27, line 11, change "With" to ---with---;
Column 27, line 30, delete ";";
Column 27, line 34, before "sound" insert ---A---;
Column 27, line 35, change "to" to ---of--- after "attention";
Column 27, line 35, change "he" to ---the---;
Column 27, line 48, change "his" to ---this---;
Column 28, line 23, i.e., claim 2, line 4, change "condcutors" to ---conductors---;
Column 31, line 5, i.e., claim 12, line 5, change "teach" to ---each---; and
Column 35, line 62, i.e., claim 37, bottom line, insert ---tube.--- after "distribution".

Signed and Sealed this

Twenty-third Day of June, 1992

*Attest:*

DOUGLAS B. COMER

*Attesting Officer* *Acting Commissioner of Patents and Trademarks*

Operations and Instructions to be programmed into computer 337

Time Date.

| | | Pas | Eff | Pomp | Dist | Nbr | Prs | Chg | Coul | Fil | TX | QS | OB | MT | AT | RA | RD | GV | PV | CS | AV | ME | — | FF |
|---|---|---|---|---|---|---|---|---|---|---|---|---|---|---|---|---|---|---|---|---|---|---|---|---|
| TX: | Text. | lo | 1.8 | 0 | 590 | 1 | 1/0 | A | **/** | 1 | — | — | — | — | — | — | — | — | — | — | — | — | — | — |
| QS: | "Outlet tail" | 10 | 1.8 | 0 | 640 | 1 | 1/0 | B | **/** | 2 | — | — | — | — | — | — | — | — | — | — | — | — | — | — |
| OB: | Open. Boeing. | 10 | | 0 | 900 | 0 | | | | | — | QS | OB | — | — | — | — | — | — | — | — | — | — | — |
| MT: | Head in operation. | 10 | 1.8 | 0 | 2590 | 1 | 2/0 | A | **/** | 5 | — | — | — | — | — | — | — | — | — | — | — | — | — | — |
| AT: | Head stop. | 10 | 1.8 | 0 | 2640 | 1 | 2/0 | B | **/** | 3 | — | — | — | — | — | — | — | — | — | — | — | — | — | — |
| RA: | Reinforcement stop. | 10 | 1.8 | 0 | 2690 | 1 | 2/0 | C | **/** | 4 | — | — | — | — | — | — | — | — | — | — | — | — | — | — |
| RD: | Reinforcement started. | 10 | | 0 | 2900 | 0 | | | | | — | QS | OB | — | — | — | — | — | — | — | — | — | — | — |
| GV: | "High speed". | 10 | | 0 | 3850 | 0 | | | | | TX | QS | OB | — | AT | — | — | GV | — | — | — | — | — | FF |
| PV: | "Low speed" | | | | | | | | | | | | | | | | | | | | | | | |
| AV: | Warning device. | | | | | | | | | | | | | | | | | | | | | | | |

TEXT: END OF BUNDLE.

FF: End of bundles